US012683845B2

(12) United States Patent
Brighenti et al.

(10) Patent No.: US 12,683,845 B2
(45) Date of Patent: Jul. 14, 2026

(54) RECONFIGURABLE CREST FACTOR REDUCTION IN A DISTRIBUTED COMMUNICATION SYSTEM

(71) Applicant: Outdoor Wireless Networks LLC, Claremont, NC (US)

(72) Inventors: Samuele Brighenti, Faenza (IT); Gabriele Moroni, Massa Lombarda (IT); Massimo Del Prete, Savignano sul Rubicone (IT); Rainer Friedrich, Maihingen (DE); Patrick Braun, Munningen (DE); Peter Schmid, Marxheim-Neuhausen (DE)

(73) Assignee: Outdoor Wireless Networks LLC, Richardson, TX (US)

( * ) Notice: Subject to any disclaimer, the term of this patent is extended or adjusted under 35 U.S.C. 154(b) by 109 days.

(21) Appl. No.: 18/482,639

(22) Filed: Oct. 6, 2023

(65) Prior Publication Data

US 2024/0121145 A1 Apr. 11, 2024

(30) Foreign Application Priority Data

Oct. 7, 2022 (IT) ........................ 102022000020688

(51) Int. Cl.
*H04L 27/26* (2006.01)

(52) U.S. Cl.
CPC ................................ *H04L 27/2623* (2013.01)

(58) Field of Classification Search
CPC ............. H04L 27/2614; H04L 27/2623; H04L 27/2624; H04L 27/2615; H04L 27/2617;
(Continued)

(56) References Cited

U.S. PATENT DOCUMENTS 7,602,697 B2 * 10/2009 Kowalski ............ H04L 27/2618
370/208
8,599,961 B2 12/2013 Schmidt et al.
(Continued)

FOREIGN PATENT DOCUMENTS

EP 2583383 B1 11/2017
WO WO-2018098692 A1 * 6/2018

OTHER PUBLICATIONS

O-Ran Alliance, "O-Ran Architecture Overview", as downloaded Dec. 22, 2021 from https://docs.o-ran-sc.org/en/latest/architecture/architecture.html, pp. 1 through 2.
(Continued)

*Primary Examiner* — Sophia Vlahos
(74) *Attorney, Agent, or Firm* — Fogg & Powers LLC

(57) ABSTRACT

To provide improvements in crest factor reduction in a distributed communication system, CFR configuration parameters can be determined based on communication signals received from a base station entity and distributed to node(s) of the distributed communication system. CFR engine(s) in the node(s) may perform CFR based on the CFR configuration parameters, and/or may adjust their CFR engine(s) based on signal parameters and/or operating parameters of a power amplifier coupled to a respective CFR engine. Some or all CFR processing may be offloaded from a node and assigned to optical transport card(s) of the system controller based on a processing bandwidth associated with the optical transport card(s).

20 Claims, 11 Drawing Sheets

(58) Field of Classification Search
CPC ............... H04L 27/2618; H04L 27/262; H04L 27/2621; H04L 27/2626; H04B 1/0475; H04B 7/022; H04B 7/024; H04B 7/2609; H04B 2001/0425; H04B 1/62; H04W 88/085
See application file for complete search history.

(56) References Cited

U.S. PATENT DOCUMENTS

| | | | |
|---|---|---|---|
| 8,824,595 B2 * | 9/2014 | Kim | H03F 1/3247 |
| | | | 375/297 |
| 8,908,607 B2 | 12/2014 | Kummetz et al. | |
| 9,014,256 B2 | 4/2015 | Ranson et al. | |
| 9,130,609 B2 | 9/2015 | Kummetz et al. | |
| 9,246,559 B2 | 1/2016 | Tarlazzi et al. | |
| 9,292,255 B2 | 3/2016 | Azadet et al. | |
| 9,813,140 B2 | 11/2017 | Lange | |
| 9,826,508 B2 | 11/2017 | Lemson et al. | |
| 9,912,387 B2 | 3/2018 | Kim et al. | |
| 9,954,585 B2 | 4/2018 | Lemson et al. | |
| 9,980,269 B2 | 5/2018 | Lange | |
| 10,454,510 B2 * | 10/2019 | Lange | H04B 1/0475 |
| 10,499,253 B2 | 12/2019 | Kummetz et al. | |
| 10,693,527 B2 | 6/2020 | Kim et al. | |
| 11,310,092 B2 | 4/2022 | Kummetz et al. | |
| 12,040,927 B2 * | 7/2024 | Sridharan | H04L 27/26265 |
| 2002/0042283 A1 * | 4/2002 | Moulsley | H04W 52/346 |
| | | | 455/524 |
| 2007/0259671 A1 * | 11/2007 | Cheng | H04L 1/20 |
| | | | 455/452.2 |
| 2010/0278530 A1 | 11/2010 | Kummetz et al. | |
| 2012/0082262 A1 * | 4/2012 | Janani | H04L 27/2623 |
| | | | 375/295 |
| 2014/0228045 A1 * | 8/2014 | Belmonte | H04W 4/021 |
| | | | 455/456.1 |
| 2015/0207545 A1 * | 7/2015 | Zhuang | H04B 7/024 |
| | | | 370/329 |
| 2018/0323834 A1 * | 11/2018 | Jiang | G01S 3/42 |
| 2019/0229760 A1 * | 7/2019 | Jiang | H04W 88/085 |
| 2019/0253098 A1 * | 8/2019 | Lv | H04B 1/1018 |
| 2022/0286339 A1 * | 9/2022 | Lei | H04B 1/005 |
| 2023/0291628 A1 * | 9/2023 | Gong | H04L 27/2623 |

OTHER PUBLICATIONS

RF Wireless World, CPRI protocol stack / RRH protocol stack, as downloaded Dec. 22, 2021 from https://www.rfwireless-world.com/Articles/CPRI-protocol-stack.html, pp. 1 through 9.

* cited by examiner

200A

200B

700

702 DETERMINE ONE OR MORE SIGNAL PARAMETERS OF A COMMUNICATION SIGNAL

704 DETERMINE ONE OR MORE CFR CONFIGURATION PARAMETERS BASED ON THE ONE OR MORE SIGNAL PARAMETERS

706 DISTRIBUTE THE ONE OR MORE CFR CONFIGURATION PARAMETERS TO A PLURALITY OF NODES CONFIGURED TO PERFORM CREST FACTOR REDUCTION

800

802    RECEIVE ONE OR MORE CFR PARAMETERS

804    DETERMINE ONE OR MORE SIGNAL PARAMETERS

806    DETERMINE ONE OR MORE OPERATING PARAMETERS OF A POWER AMPLIFIER

808    ADJUST SIGNAL CLIPPING THRESHOLD BASED ON CFR PARAMETERS, SIGNAL PARAMETERS, AND OPERATING PARAMETERS

810    CONFIGURE OUTPUT OF CFR PROCESSOR BASED ON SIGNAL CLIPPING THRESHOLD

900

902

RECEIVE CFR-COMPENSATED OUTPUT SIGNAL

904

DETERMINE INTERFERENCE CHARACTERISTIC OF CFR-COMPENSATED OUTPUT SIGNAL

906

INTERFERENCE BELOW THRESHOLD?

YES

NO

908

ADJUST SIGNAL CLIPPING THRESHOLD

RECONFIGURABLE CREST FACTOR REDUCTION IN A DISTRIBUTED COMMUNICATION SYSTEM

CROSS-REFERENCE TO RELATED APPLICATIONS

This application claims priority to Italian Patent Application No. 102022000020688 filed on Oct. 7, 2022, and titled "RECONFIGURABLE CREST FACTOR REDUCTION IN A DISTRIBUTED COMMUNICATION SYSTEM," the contents of which are incorporated herein by reference in their entirety.

BACKGROUND

Distributed communication systems are implemented to improve signal coverage by distributing communication signals across a coverage zone in a communication network. These systems generally operate by transporting information represented as electromagnetic, optical, and/or radio frequency signals to other nodes in the distributed communication system, and ultimately to and from terminal devices utilizing the communication network. For example, in a distributed antenna system (DAS), a remote antenna unit receives downlink signals from a master unit typically in the form of optical transport signals. The remote antenna unit converts these downlink optical signals into corresponding electrical signals for additional processing before then converting the electrical signals into radio frequency signals that are communicated via an antenna to terminal devices. Other distributed communication systems may use different modulation and coding schemes.

Widely used electromagnetic signal modulation and multiple access techniques result in time-domain signals with high peak-to-average ratios (PAR), which can degrade the quality of the signal as communicated to and from various points of the distributed communication system and additionally can cause excessive high non-linear emissions. One particular example is when electric signals are amplified by a power amplifier. Although power amplifiers increase the output signal power, an input signal with too high of a crest factor can cause the power amplifier to work in a saturated region. As a result, the power amplifier generates disproportionately high intermodulation products in-band and out of band, impacting the signal quality (modulation accuracy) and the out of band unwanted emissions.

One technique to reduce saturation in a power amplifier is known as crest factor reduction (CFR). Conventional implementations available for CFR are clip-and-filter, peak windowing, and pulse cancellation. CFR is conventionally implemented in one or more nodes of a distributed communications system to clip excess input signal levels so that the power amplifier can continuously operate linearly. Conventional CFR techniques, however, statically distort input signals as a compromise to keep the benefits provided by signal amplification in signal modulation. They do not adapt to the changing parameters of the node, the signals communicated through the distributed communications system, or more broadly to the distributed communication system itself.

Accordingly, a need exists to dynamically monitor crest factor reduction of signals in a distributed communication system based on other system parameters.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a distributed communications system is disclosed. The distributed communication system comprises a system controller. The system controller comprises a network interface configured to receive communication signals from at least one base station. The system controller comprises at least one processor coupled to the network interface. The at least one processor is configured to determine at least one signal parameter of the communication signals. The at least one processor is configured to determine at least one crest factor reduction (CFR) configuration parameter based on the at least one signal parameter. The distributed communications system further comprises a plurality of nodes communicatively coupled to the system controller. Each node of the plurality of nodes comprises a CFR engine configured to implement a CFR process. The system controller is configured to distribute the at least one CFR configuration parameter to each node by transmitting a transport signal including the at least one CFR configuration parameter to each node. Each node is configured to generate a CFR-compensated output signal from the transport signal based on the at least one CFR configuration parameter corresponding to each node. Each node is configured to generate an amplified signal based on the CFR-compensated output signal. Each node is configured to transmit an output signal based on the amplified signal to one or more terminal devices.

In another embodiment, a node of a distributed communications system is disclosed. The node comprises a crest factor reduction (CFR) engine configured to receive a digital signal and configured to implement a CFR process with the digital signal to generate a CFR-compensated signal. The node comprises a digital-to-analog converter configured to convert the CFR-compensated signal to an analog signal. The node comprises a power amplifier configured to generate an amplified signal from the analog signal. The node comprises at least one processor coupled to the CFR engine and the power amplifier. The at least one processor is configured to receive one or more of: at least one operating parameter of the power amplifier; or at least one signal parameter of the CFR-compensated signal. The at least one processor is configured to adjust a signal clipping threshold of the CFR process based on one or more of: the at least one operating parameter of the power amplifier and the at least one signal parameter of the CFR-compensated signal. The node is configured to transmit an output signal based on the amplified signal to one or more terminal devices serviced by the distributed communications system.

In another embodiment, a method for reconfiguring a plurality of nodes of a distributed communications system is disclosed. Each node is configured to generate a crest factor reduction (CFR)-compensated signal and to transmit an output signal based on the CFR-compensated signal to one or more terminal devices serviced by the distributed communications system. The method comprises receiving a communications signal from at least one base station. The method comprises determining at least one signal parameter of the communications signal. The method comprises determining at least one CFR configuration parameter based on the at least one signal parameter of the communications signal. The method comprises distributing the at least one CFR configuration parameter to the plurality of nodes.

In another embodiment, a method for adjusting a signal clipping threshold provided to a crest factor reduction (CFR) engine is disclosed. The method comprises determining one or more of: at least one operating parameter of a power amplifier coupled to an output of the CFR engine, or at least one signal parameter of an output signal of the CFR engine. The method comprises adjusting the signal clipping threshold based on the one or more of: the at least one signal parameter of the output signal or the at least one operating parameter of the power amplifier. The method comprises configuring the CFR engine to perform CFR on a digital signal based on the adjusted signal clipping threshold.

Other embodiments are also disclosed.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
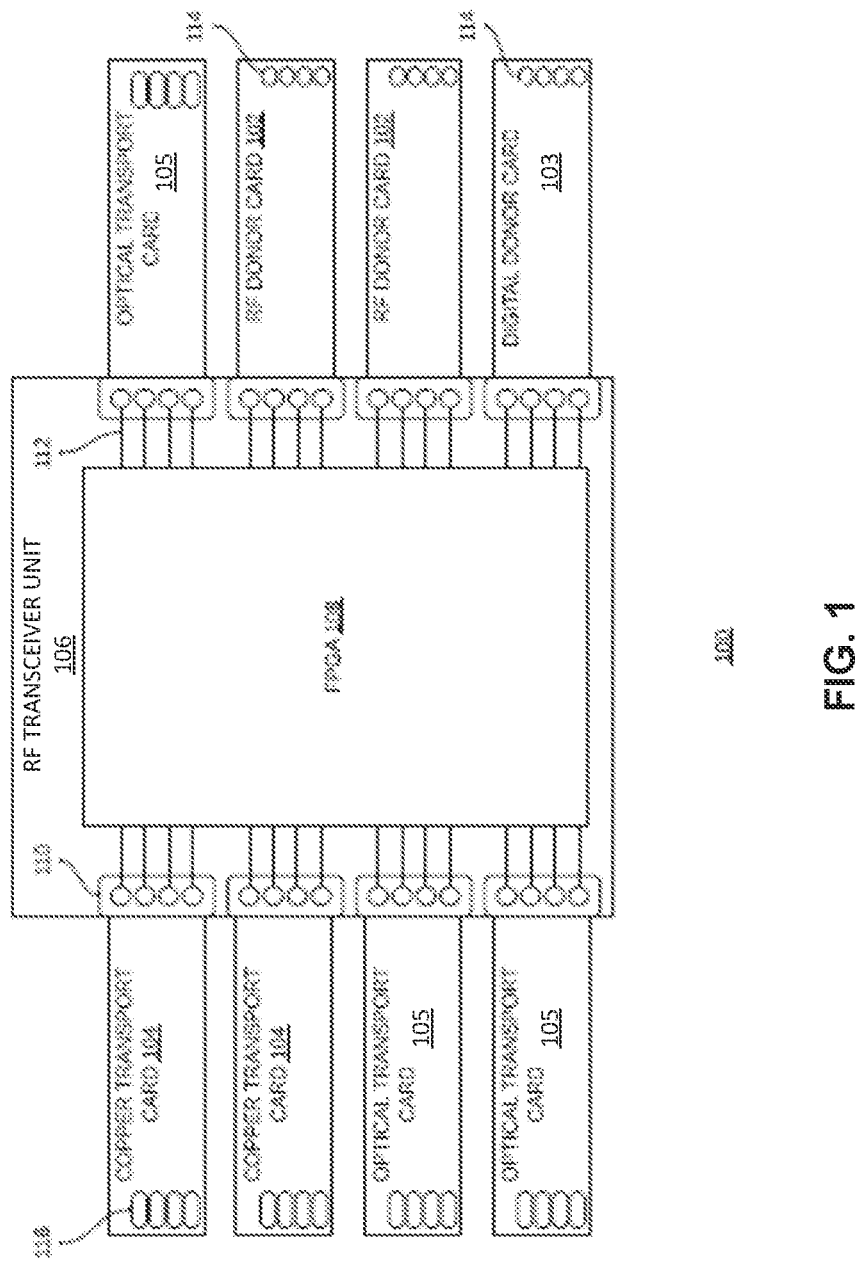
FIG. 1 depicts a block diagram of a master unit of a distributed antenna system configured to offload CFR processing to one or more optical cards and one or more copper cards according to one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

The following description and accompanying drawings provide improvements to crest factor reduction processing in a distributed communication system including a distributed antenna system. As previously described, conventional crest factor reduction techniques statically reduce the crest factor of an input signal to prevent saturation of a power amplifier. In contrast, embodiments of the present disclosure provide dynamic crest factor reduction based on other signal parameters along with parameters of a power amplifier. Additional or alternative aspects include techniques for monitoring and reconfiguring crest factor reduction throughout a distributed communication system based on parameters of a downlink and/or uplink signal.

Embodiments will now be described with reference to the accompanying drawings.

FIG. 1 is a block diagram illustrating one way to implement a master unit 100 of a DAS. In the example shown in FIG. 1, digital transport is used in the DAS. The master unit 100 typically includes one or more donor cards, one or more transport cards, and one or more RF transceiver units 106 configured to implement one or more active backplanes. In this example, each RF transceiver unit 106 comprises a plurality of slots, where either a donor card (e.g., RF donor card 102 or digital donor card 103) or a transport card (e.g., copper transport card 104 or optical transport card 105) can be inserted into each slot. Each RF transceiver unit 106 comprises a field programmable gate array (FPGA) 108 that is configured to process, format, and route data communicated between the donor cards and transport cards. Also, each RF transceiver unit 106 comprises, for each slot into which either a donor card or transport card can be inserted, a respective backplane connector 110 that is used to couple that donor card or transport card to the FPGA 108. Each backplane connector 110, in this example, includes multiple separate backplane channels 112 over which data can be separately communicated between the associated donor or transport card and the FPGA 108. In this example, each backplane connector 110 includes a respective backplane channel 112 for each external interface of the associated donor or transport card (that is, each base station interface 114 (described below) of a donor card or each cable interface 116 (described below) of a transport card).

In the example shown in FIG. 1, each donor card includes multiple base station interfaces 114 that are used to couple the master unit 100 (and the DAS more generally) to one or more base stations. In the example shown in FIG. 1, some of the donor cards are configured to be coupled to the external analog radio frequency (RF) interface of a base station that would otherwise be used to couple the base station to one or more antennas (if a DAS were not used). These donor cards are also referred to here as "RF donor cards" 102. Also, in the example shown in FIG. 1, some of the donor cards are configured to be coupled to a digital baseband interface used for fronthaul communications between a baseband unit (BBU) and each remote radio head (RRH) of a base station. Examples of such digital baseband interfaces include, without limitation, digital baseband interfaces complying with the Common Public Radio Interface ("CPRI") protocol, the Enhanced CPRI (eCPRI) protocol, the Open Radio Equipment Interface ("ORI") protocol, the Open Base Station Standard Initiative ("OBSAI") protocol, Open Radio Access Network (O-RAN) or other protocol. These donor cards are also referred to here as "digital donor cards" 103.

In the example shown in FIG. 1, each transport card includes multiple cable interfaces 116, each of which is used to couple the master unit 100 to one or more remote antenna units of the DAS (either directly or indirectly via one or more other remote antenna units and/or via one or more intermediary or expansion units). In the example shown in FIG. 1, some of the transport cards are configured to communicate over optical cables; these transport cards are also referred to here as "optical transport cards" 105. Also, in the example shown in FIG. 1, some of transport cards are configured to communicate over copper cables (for example, twisted-pair cables or coaxial cables) and are also referred to here as "copper transport cards" 104. In this example, the copper transport cards 104 can also be configured to provide power to the remote antenna units (and any expansion units) over the copper cables (for example, using Power-over-Ethernet (PoE) or direct current (DC) line-power techniques).

As noted above, each RF transceiver unit 106 comprises an FPGA 108 that is configured to process, format, and route data communicated between the donor cards and transport cards. For each base station interface 114 of each RF donor card 102, the RF donor card 102 generates a respective stream of downlink digital samples from the analog downlink RF signals received from the base station coupled to that base station interface 114. For each base station interface 114 of each digital donor card 103, the digital donor card 103 terminates a respective stream of downlink digital samples received from a BBU of the base station coupled to that base station interface 114 via a digital baseband interface and, if necessary, converts (by re-sampling, synchronizing, combining, separating, gain adjusting, etc.) it into a stream of downlink digital samples compatible with the DAS. Each stream of downlink digital sample generated by a RF or digital donor card 103 is output to the FPGA 108 in the RF transceiver unit 106 via a respective backplane channel 112 of the backplane connector 110 to which that donor card is connected. For each cable interface 116 of each transport card, the FPGA 108 of the RF transceiver unit 106 multiplexes (frames) the streams of downlink digital samples for the base stations served by the set of remote antenna units coupled to that cable interface 116 and outputs the multiplexed streams to that transport card 104 on the appropriate backplane channel 112 of the backplane connector 110 used to connect that transport card to the RF transceiver unit 106. For each cable interface 116 of each transport card, the transport card transmits the multiplexed streams of downlink digital samples to the set of remote antenna units coupled to that cable interface 116 via the attached cabling (and any intermediary devices).

For each cable interface 116 of each transport card, the transport card receives multiplexed streams of uplink digital samples from the set of remote antenna units coupled to that cable interface 116 and outputs the multiplexed streams of uplink digital samples to the FPGA 108 of the RF transceiver unit 106 on the appropriate backplane channel 112 of the backplane connector 110 used to connect that transport card to the RF transceiver unit 106. For each base station interface 114 of each donor card, the FPGA 108 extracts the individual streams of uplink digital samples generated by the various remote antenna units serving the base station coupled to that base station interface 114, digitally sums the corresponding uplink digital samples from the various remote antenna units, and outputs the stream of summed uplink digital samples to the donor card 102 on the appropriate backplane channel 112 of the backplane connector 110 used to connect that donor card to the RF transceiver unit 106. For each base station interface 114 of each RF donor card 102, the RF donor card 102 generates an analog uplink RF signal from the stream of summed uplink digital samples for the base station coupled to that base station interface 114 and outputs the resulting analog uplink RF signal to that base station. For each base station interface 114 of each digital donor card 103, the digital donor card 103 receives the stream of summed uplink digital samples for the base station coupled to that base station interface 114, if necessary, converts (by re-sampling, synchronizing, combining, separating, gain adjusting, etc.) it into a stream of uplink digital samples compatible with the digital baseband interface used by the BBU of the base station coupled to that digital donor card 103, and outputs the resulting stream of uplink digital samples to that BBU via the appropriate digital baseband interface.

In the example shown in FIG. 1, the RF transceiver unit 106 comprises eight slots into which donor cards or transport cards can be inserted. In one implementation of this example, the RF transceiver unit 106 is implemented in a form that is two rack units (RUs) in size. If the DAS requires a larger number of donor cards or transport cards, a larger capacity activity backplane 106 can be used. In one implementation, the RF transceiver unit 106 is implemented in a form that is four rack units (RUs) in size. If the DAS requires more donor cards or transport cards than can be accommodated by the largest capacity RF transceiver unit 106, two (or more) RF transceiver unit 106 can be interconnected with each other using transport cards.

As previously described, master units in a DAS include signal processing functionality on downlink or uplink signals transmitted by the RF transceiver unit 106. The master unit 100 described in FIG. 1 may also include a CFR function configured to reduce the crest factor of a signal. While the CFR function can be implemented by the FPGA 108 or other processing device on the RF transceiver unit 106, alternatively the CFR function is implemented on the optical transport cards 105 that couple to the RF transceiver unit 106. Offloading the CFR function and associated processing from the FPGA 108 to the optical transport cards 105 improves the processing bandwidth of the FPGA 108. Particularly for during high signal traffic exchanged between the distributed antenna system, e.g., the signals received in the uplink and transmitted in the downlink from RF transceiver unit 106, the FPGA 108 can instead allocate additional processing resources to support other nodes in the DAS.

Figure 2A:
FIGS. 2A-2B depict block diagrams of systems configured to configure CFR engines in nodes of a distributed communication system according to one or more embodiments.
Figure 2A:
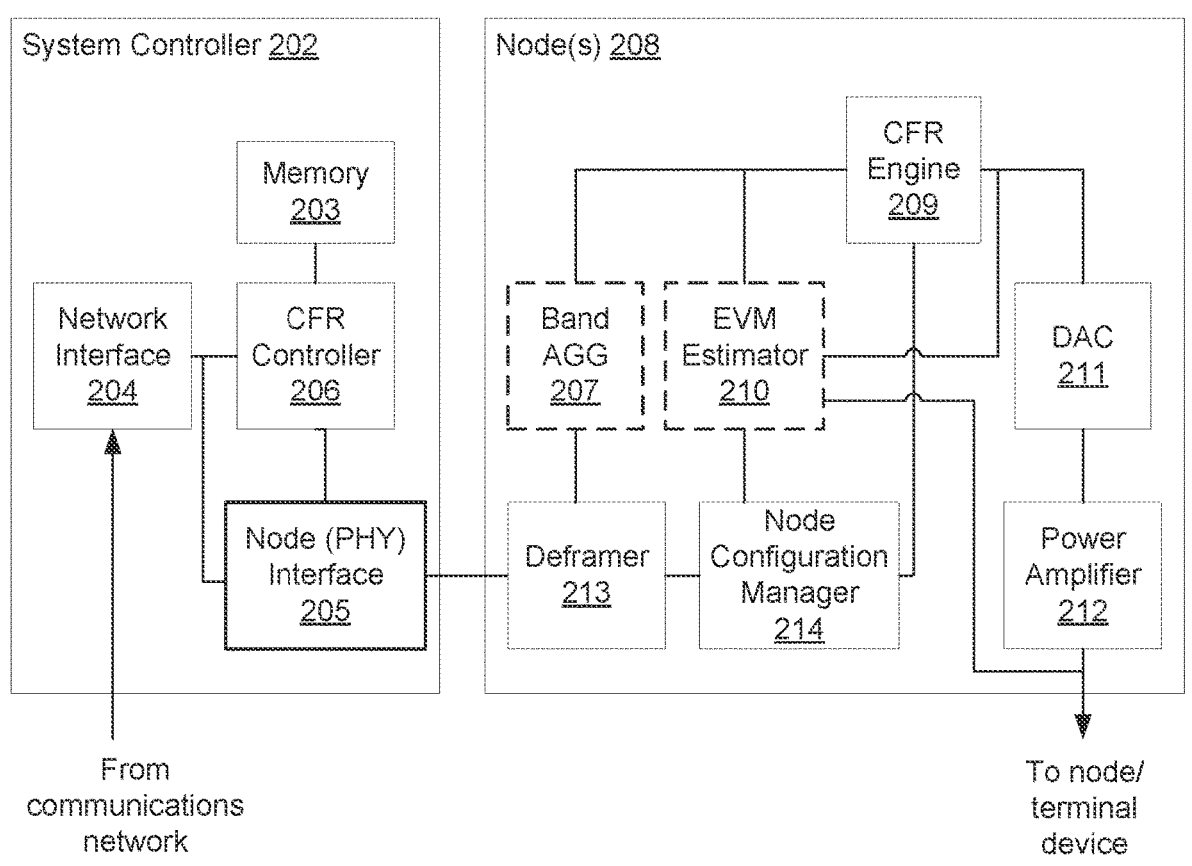
Figure 2B:
Figure 2B:
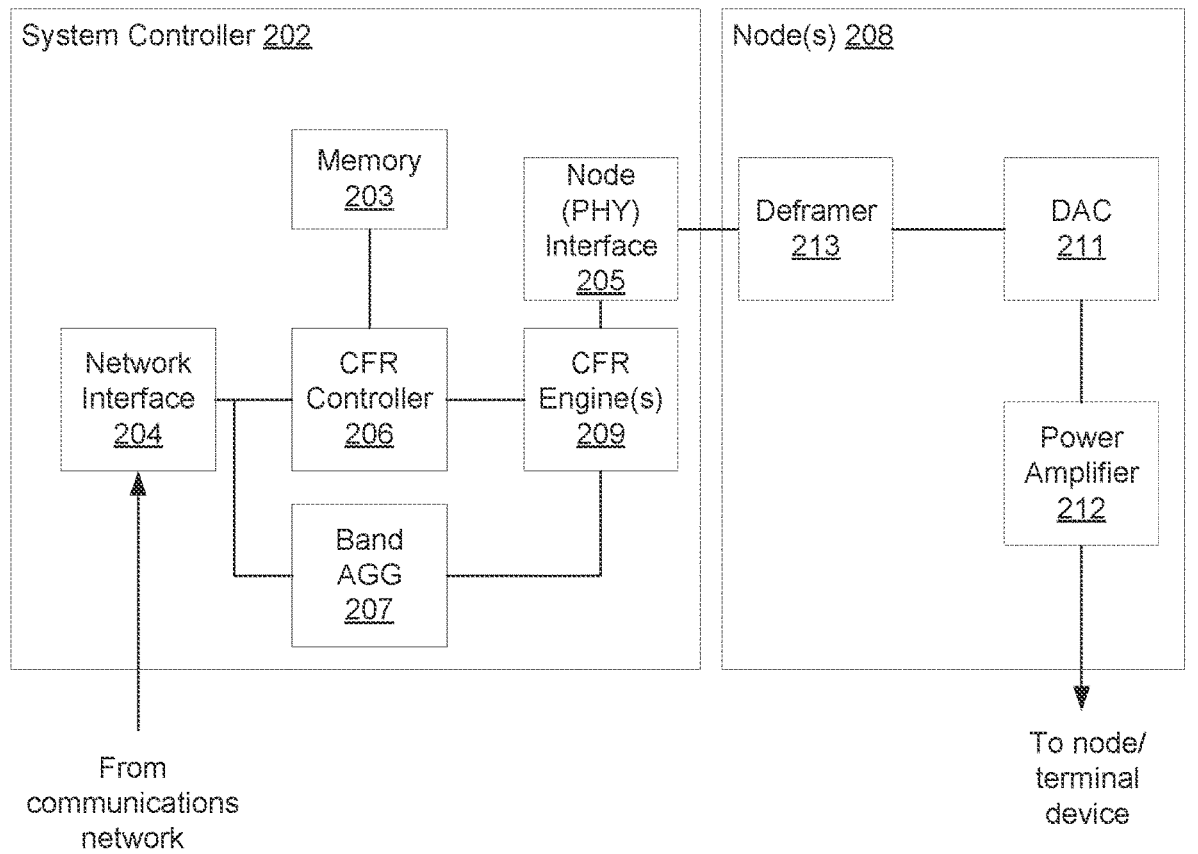

FIGS. 2A-2B depict block diagrams of system configured to configure CFR engines in nodes of a distributed communication system, such as a DAS. FIG. 2A illustrates a system 200A in which the nodes 208 include a band aggregator (AGG) 207, EVM estimator 210, and a node configuration manager 214. FIG. 2B illustrates a system 200B in which the band aggregator 207 is implemented in the system controller 202. Both systems 200A and system 200B include a system controller 202 communicatively (e.g., remotely) coupled to one or more nodes 208. Both systems can be implemented as part of a distributed antenna system, radio access network, or other distributed communication system. For example, in a distributed antenna system, system controller 202 can be implemented in a host or master unit, intermediate unit, or as an independent unit communicatively coupled to a host unit, intermediate unit, or remote antenna unit. Similarly, in a radio access network, system controller 202 can be implemented in a radio access point or as an independent unit communicatively coupled to one or more radio access points. Other implementations are possible. In various embodiments, the system controller 202 and/or node 208 can be implemented as a wireless intermediate node (WIN node), central access node (CAN node), transport expansion node (TEN node), or other node in a distributed communication system. For pedagogical illustration, the distributed communication system is described as a distributed antenna system understanding that other distributed communication systems including the examples given above may be used.

Referring to system 200A, system controller 202 further includes a network interface 204. The network interface 204 is configured to communicatively couple the system 200A (via system controller 202) to a communications network. For example, when system 200A is implemented in an analog distributed antenna system, network interface 204 includes a radio frequency interface configured to communicatively couple the system controller 202 to a base transceiver station or baseband RF module. In another implementation in which system 200A is implemented in a digital distributed communication system such as a digital distributed antenna system, the network interface 204 includes a fronthaul interface to communicatively couple the system controller 202 to a baseband unit. Fronthaul interfaces can be utilized via a standard communications protocol such as CPRI and OBSAI.

System controller 202 also includes a CFR controller 206 coupled to a memory 203. The CFR controller 206 is configured to define and update parameters used for CFR performed in the nodes 208 based on signal parameters. CFR controller 206 can receive such signal parameters from network interface 204 (that is, through configuration parameters sent by the baseband unit, base transceiver station, or core network). CFR controller 206 can also include baseband processing circuitry configured to extract signal parameters from the baseband data acquired from downlink signals from one or more base stations. Upon determining the signal parameters, CFR controller 206 is then configured to determine the CFR configurations for each node 208 based on the signal parameters received from network interface 204, and to send the CFR configuration parameters to each node 208. Additionally, CFR controller 206 is configured to update the CFR configuration parameters as new signal parameters are received.

CFR controller 206, and system controller 202 more generally, may include any one or combination of processors, microprocessors, digital signal processors, application specific integrated circuits, field programmable gate arrays, and/or other similar variants thereof. CFR controller 206 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Signal parameters received by CFR controller 206 can be stored in memory 203. Memory 203 can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. The memory may also include one or more databases to store acquired data. Additionally, memory 203 can be configured to store CFR configuration parameters determined by CFR controller 206.

In some implementations, the signal parameters used to reconfigure CFR processing include signal parameters of downlink signals that are received by the CFR controller 206. Examples of signal parameters include signal technology, signal bandwidth, signal power, signal spectrum, or carrier configuration(s) of the communication signals received by CFR controller 206.

As shown in FIG. 2A, system controller 202 is communicatively coupled to one or more nodes 208. In an analog or digital distributed antenna system, nodes 208 can be a remote unit or intermediate unit. In a distributed antenna system architecture, the master unit receives downlink signals from a base station and includes circuitry configured to generate a downlink transport signal from the downlink signals provided by the base station. The master unit then distributes the downlink transport signals to one or more remote units communicatively coupled to the master unit. Each remote unit receives the downlink transport signal and includes circuitry configured to convert the downlink transport signals into a radio frequency signal. In the distributed antenna system, each remote unit further includes at least one antenna configured to radiate the downlink radio frequency signals to terminal devices (phones, laptops, etc.).

Figure 6:
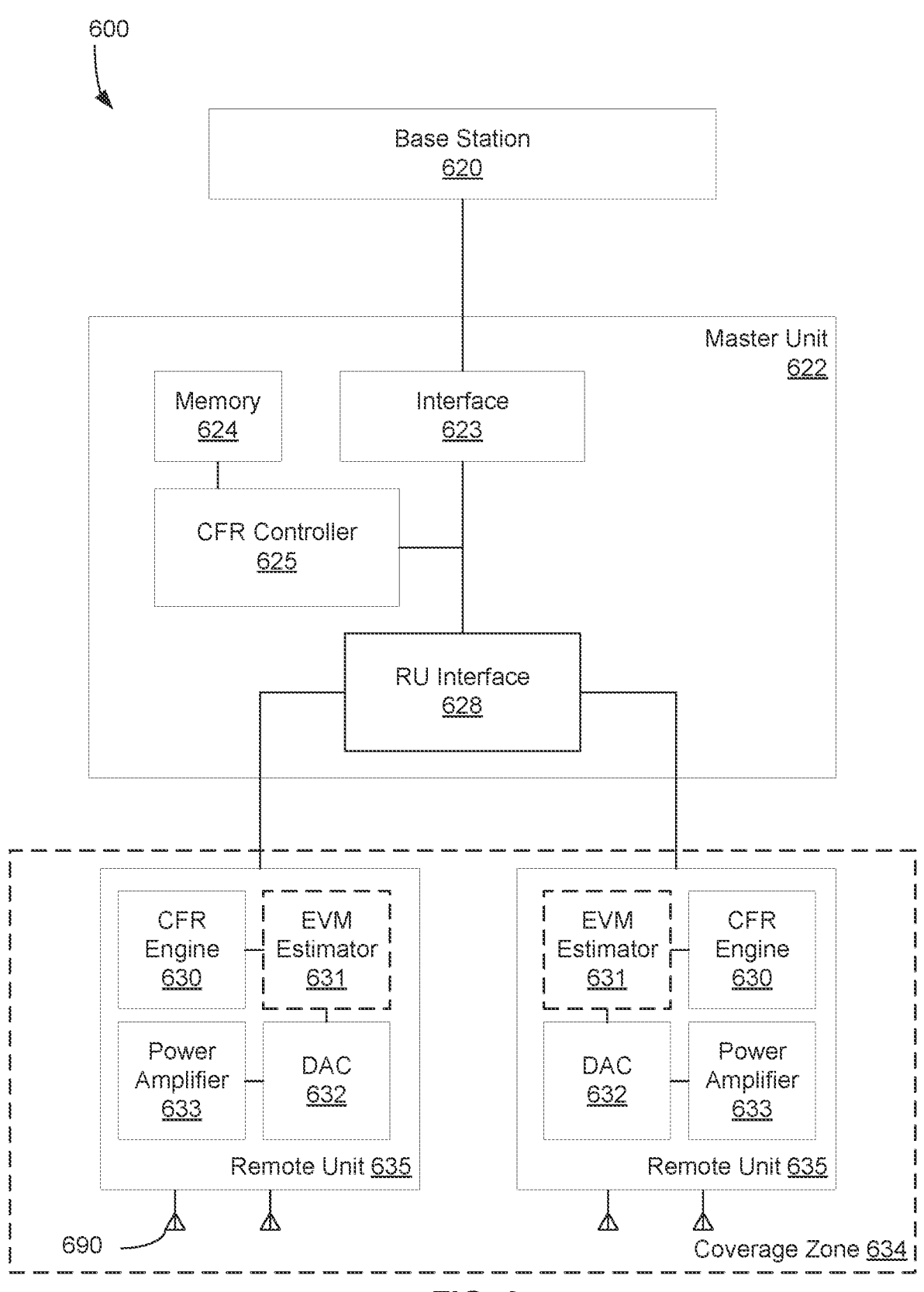
FIG. 6 depicts a block diagram of a distributed antenna system according to one or more embodiments.

An analogous process is performed in the uplink direction. Uplink radio frequency signals transmitted from the terminal devices are received at each remote unit by the antenna(s). The remote unit circuitry is configured to generate an uplink transport signal from the uplink radio frequency signals and transmit the uplink transport signals to the corresponding master unit. The master unit circuitry then combines signals communicated by each corresponding remote unit and converts the uplink transport signals into a processed uplink signal suitable for transmission to the base station or baseband unit, depending on the implementation. In some distributed antenna systems, intermediate units are coupled between the master unit and corresponding remote units to improve distributed antenna system coverage. Each intermediate unit includes circuitry configured to transport downlink and uplink signals to the remote units and master units, respectively. One example of a distributed antenna system in accordance with node 208 is shown in FIG. 6.

In some implementations, the functions of the system controller 202 and node 208 are performed by nodes of a virtualized DAS (vDAS). In a vDAS, the functions of the master unit or the remote unit as described above are implemented using one or more virtual network functions (VNFs) executing on one or more physical server computers. Some examples of a vDAS architecture are described in Indian Provisional Patent Application Number 202241026567, titled "VIRTUALIZED DISTRIBUTED ANTENNA SYSTEM."

Still referring to FIG. 2A, system controller 202 includes a node interface 205. Node interface 205 includes a physical layer (PHY) circuit (e.g., a digital transceiver) or function configured to provide a physical interface to the communication medium via which downlink signals are received from a base station. For example, node interface 205 can receive an optical downlink transmitted via fiber-optic cable and convert the optical downlink signal to an electrical downlink signal. Node interface 205 can also perform error correction on data received from the base station. Error correction can include detecting whether errors occurred during the transmission of the data packets. Non-limiting examples of errors may include failing to receive one or more data packets or receiving the data packets out of order. Node interface 205 can request that the base station re-send lost data packets. Node interface 205 can also synchronize communications between the node 208 and the base station.

Node interface 205 includes, or is coupled to, a framer circuit. The framer circuit of the node interface 205 is configured to convert the downlink signals from the base station into a complex digital signal. The complex digital signal can be a baseband digital signal that is an I/Q signal. The complex digital signal outputted by the node interface 205 can also include multiple I/Q channels. Each I/Q channel represents a portion of a frequency band to be provided to the node 208 or group of nodes 208. For example, the complex digital signal can include one channel with frequencies within the A and B frequency blocks of the cellular frequency and another channel with frequencies within one of the frequency blocks of the personal communications services ("PCS") frequency band. Node interface 205 is configured to block each I/Q channel into one or more data frames and provide the complex digital signal containing the one or more data frames to each node 208. In the example shown in system 200A, each node 208 includes a de-framer 213 that is configured to de-frame the complex digital signal. In the downlink path, the de-framer 213 can de-frame the complex digital signal in a standardized format to extract control data and carrier data from each data packet. The de-framer 213 (which can be implemented as a de-framing circuit) can provide the de-framed digital signal to node configuration manager 214 and optionally to band aggregator 207. Band aggregator 207 is configured to combine complex de-framed digital signals from de-framer 213 from one or more interface cards. In some implementations, the band aggregator 207 includes a summer that combines complex digital signal associated with frequencies in a common band. The band aggregator 207 is configured to output a combined digital signal in the downlink path to CFR engine 209. However, band aggregator 207 is optional because it may be included in system controller 202 (see FIG. 2B) or because in some implementations, CFR engine 209 can perform CFR on the de-framed digital signal from de-framer 213.

Node configuration manager 214 receives the de-framed digital signal from de-framer 213. Node configuration manager 214 is configured to extract and gather the CFR configuration parameters from the de-framed digital signal that corresponds to the CFR configuration parameters determined from CFR controller 206. Based on the CFR configuration parameters for each transceiver path of the node 208, node configuration manager 214 is configured to adjust the CFR engine 209 for example, by sending control signals to CFR engine 209. For example, node configuration manager 214 may extract the signal amplitude parameter from the list of CFR configuration parameters associated with the de-framed digital signal. It then determines whether the CFR-compensated output signal produced by CFR engine 209 will have the specified signal amplitude, or will be within an acceptable signal amplitude range. If not, node configuration manager 214 then configures the CFR engine 209 so that CFR engine 209 produces a CFR-compensated output signal satisfying the signal amplitude parameter. As another example, node configuration manager 214 determines the configuration of aggregated carriers that correspond to each portion of the de-serialized, de-framed digital signal, and configures the CFR engine 209 to produce a CFR-compensated output signal with different signal characteristics corresponding to each carrier. In some embodiments, node configuration manager 214 also configures other components of the node 208 based on the extracted CFR configuration parameters, such as optional band aggregator 207 and/or EVM estimator 210.

Optionally, one or more nodes 208 include an error vector magnitude (EVM) estimator 210 coupled to the output of the respective CFR engine 209 and/or the input of the respective CFR engine 209. When coupled to the output of CFR engine 209, EVM estimator 210 is configured to determine a signal interference characteristic such as the error vector magnitude of the CFR-compensated output signals, which provides an indicator of the quality of the signals compensated by CFR techniques. In one example, EVM estimator 210 determines the ratio of the average magnitude of the error vector and an expected reference vector (e.g., test signal) magnitude. The ratio can be averaged over multiple iterations. Also, EVM estimator 210 can determine other signal interference characteristics, such as the adjacent channel leakage ratio (ACLR) (the ratio of the transmitted power of the signal channel to the power received in an adjacent channel). When coupled to the input of CFR engine 209, EVM estimator is configured to determine the estimated signal interference characteristic (e.g., the EVM degradation) of the CFR-compensated output signal caused by the CFR process from the received input signal to the CFR engine 209 (e.g., the de-framed digital signal or the summed digital signal). EVM estimator 210 is optionally coupled to the output of power amplifier 212, in which EVM estimator 210 receives the output signal from the power amplifier 212 and determines the signal interference characteristic of the output signal caused by the CFR process executed by CFR engine 209. In some embodiments, EVM estimator 210 optionally provides the EVM or other signal interference characteristic to node configuration manager 214, which enables the node configuration manager 214 to adjust CFR engine 209 based on the signal interference characteristic.

Each node 208 also includes a CFR engine 209 configured to perform crest factor reduction in accordance with the CFR parameters provided by CFR controller 206. Each CFR engine 209 can include hardware or firmware that implements a CFR algorithm to reduce the PAPR of the downlink signals received from system controller 202. In an example, CFR engine 209 inputs the CFR configuration parameters from CFR controller 206 and/or additional parameters (such as parameters of the power amplifier and the properties of the downlink signal as described further below) and adjusts the peak level of the downlink signal based on the CFR configuration parameters. Some examples of CFR configuration parameters include the re-sampling rate, clipping threshold, and CFR coefficients indicative of the amount of filtering to achieve the desired output signal. In one embodiment, CFR engine 209 receives control signals from node configuration manager 214 directing CFR engine 209 to perform CFR in accordance with the CFR configuration parameters. As shown in system 200A, CFR 209 is configured to generate a CFR-compensated output signal from the input signal (e.g., the de-framed digital signal or the summed digital signal) received from de-framer 213 or band aggregator 207. Additionally, CFR engine 209 may send acknowledge or diagnostic messages to CFR controller 206. In one embodiment, CFR engine 209 is configured to perform CFR in accordance with adaptive or dynamic CFR configuration parameters, such as described further with respect to FIG. 5.

In some implementations, the CFR engine 209 sends the output CFR-compensated signal to a digital-analog converter (DAC) 211. The DAC 211 is configured to convert the CFR-compensated output signal into a corresponding analog signal. The CFR-compensated analog signal is then provided to power amplifier 212 coupled to DAC 211, which is configured to amplify the CFR-compensated output signal and to output the analog signal for transmission to a terminal device. For example, power amplifier 212 can be configured to provide the amplified analog signal to one or more antennas communicatively coupled to the node 208, which then radiate a radio frequency signal based on the amplified analog signal to one or more terminal devices. Although not shown in FIG. 2, node 208 (e.g., CFR engine 209 and/or node configuration manager 214) can include digital predistortion DPD circuitry that processes the CFR-compensated output signal in combination with power amplifier 212. Each node 208 may also include additional digital or analog circuitry that processes the downlink signal before transmission of the CFR-compensated output signal to the nodes or terminal devices.

In some embodiments, the signal interference characteristic determinations are provided from node configuration manager 214 or CFR engine 209 (e.g., via the diagnostic messages referenced above) to CFR controller 206. CFR controller 206 is configured in response to determine whether the CFR configurations implemented by each CFR engine 209 introduce unacceptable levels of signal degradation (that is, whether the node 208 is performing CFR in accordance with the determined CFR configuration parameters transmitted by CFR controller 206). In one implementation, CFR controller 206 is configured to compare the signal interference characteristics to a threshold level indicative of a level of signal interference of the CFR-compensated output signal (the signal that has been generated as a result of CFR processing by CFR engine 209). If any of the signal interference characteristics for a respective node 208 exceed the signal interference threshold level (e.g., an EVM threshold), then the CFR-compensated output signals are determined to be improperly configured for that respective CFR engine 209. As an example, if the signal interference characteristic for a respective node 208 includes an EVM determination, CFR controller 206 then compares the EVM determination to an EVM threshold to determine whether the EVM determination exceeds the EVM threshold.

The CFR controller 206 can take various actions in response if the signal interference characteristic exceeds the signal interference characteristic threshold. In one example, the CFR controller 206 is configured to adjust the peak signal of the input signals received for each CFR engine 209 whose corresponding signal interference characteristics exceed the signal interference characteristic threshold, such as by increasing the peak signal level with a respective higher clipping threshold to avoid over-clipping. Additionally, or alternatively, the CFR controller 206 is configured to adjust the CFR configuration parameters provided to the respective CFR engine 209 based on the signal interference characteristics corresponding to that respective CFR engine 209. In yet another example, CFR controller 206 is configured to generate an alarm and/or feedback message to the node configuration manager 214 or CFR engine 209. The feedback message can include information that the signal interference characteristics exceed the signal interference characteristic threshold, in addition to messages notifying the node configuration manager 214 that the CFR configuration parameters have been adjusted (and to what extent) or that the peak signal level of the CFR engine 209 has been adjusted. In this way, the CFR controller 206 can receive feedback of the CFR techniques conducted at each of the downstream nodes 208 and dynamically adjust the CFR parameters for each node 208 on a system level.

Now referring to FIG. 2B, an alternative exemplary embodiment of a distributed communication system 200B is illustrated. Unless otherwise described, components with reference numerals in system 200A that are identical to system 200B perform the same function and may have the same structure features.

System 200B illustrates an implementation in which the system controller 202 includes one or more CFR engines 209 configured to perform CFR on a digital signal from band aggregator 207. In system 200B, system controller 202 is configured to provide a CFR-compensated output signal to one or more nodes 208. Specifically, CFR engine 209 is configured to receive a summed digital signal in the downlink path from band aggregator 207. CFR engine 209 is also configured to receive the CFR configuration parameters from CFR controller 206 (as described above, CFR controller 206 is configured to determine the CFR configuration parameters from the signal parameters from the downlink digital signals received by network interface 204). In response, CFR engine 209 generates a CFR-compensated output signal from the digital downlink signal based on the CFR configuration parameters and provides the CFR-compensated output signal to node interface 205.

In system 200B, node interface 205 is configured to block the CFR-compensated output signal into frames. The CFR-compensated output signal is converted to a complex digital signal and provided to de-framer 213, which is configured to de-frame the CFR-compensated complex digital signal. De-framer 213 is then configured to provide the de-framed CFR-compensated output signal to DAC 211. DAC 211 and power amplifier 212 function similarly as described in system 200A.

Figure 3A:
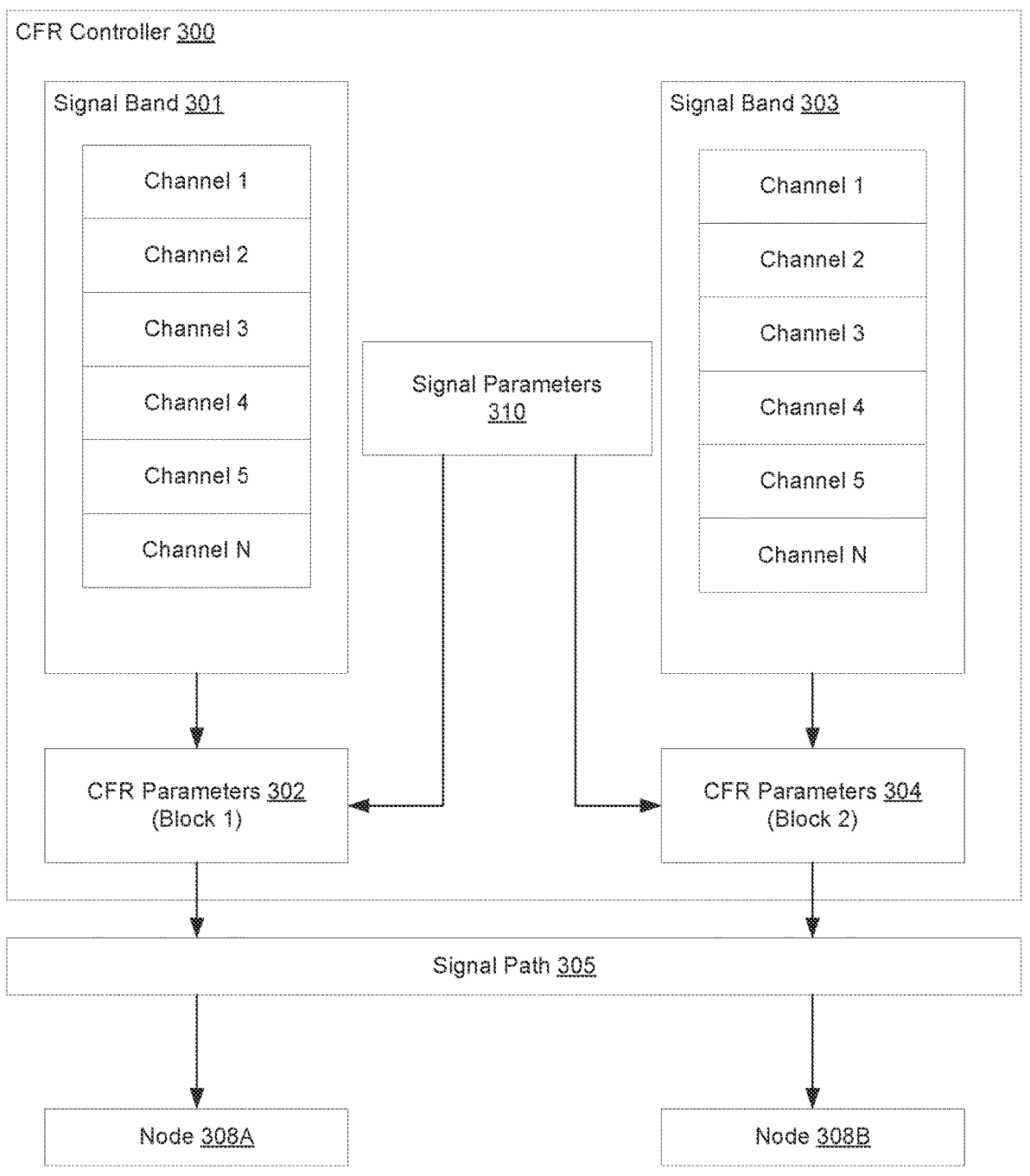
FIG. 3A depicts a block diagram of signal bands communicated between a CFR controller and one or more nodes of a distributed communication system according to one or more embodiments.

FIG. 3A depicts a flow diagram of determining CFR configuration parameters for nodes of a distributed communication system such as nodes 208 of systems 200A and 200B. CFR controller in one implementation is analogous to CFR controller 206 of FIGS. 2A-2B. In FIG. 3A, CFR controller 300 determines signal parameters 310 corresponding to a plurality of signal bands 301 and 303 each including a plurality of channels 1-N, where N is an arbitrary integer. CFR controller 300 then uses the signal parameters 310 to generate a set of CFR configuration parameters for each respective signal band. As shown in FIG. 3A, CFR controller 300 determines a set of CFR configuration parameters 302 corresponding to signal band 301 and a set of CFR configuration parameters 304 corresponding to signal band 303. CFR controller 300 then provides the CFR configuration parameters 302, 304 of each signal band 301, 303 to a signal path 305. The signal path 305 can include, for example, a communication bus, communication link, or other signal pathway. Signal path 305 then provides the signal bands 301, 303 and their respective CFR configuration parameters 302, 304 to their respective nodes in the distributed communication system. For example, signal path 305 is configured to provide signal band 301 and associated CFR configuration parameters 302 to node 308A and also configured to provide signal band 303 and associated CFR configuration parameters 304 to node 308B.

Figure 3B:
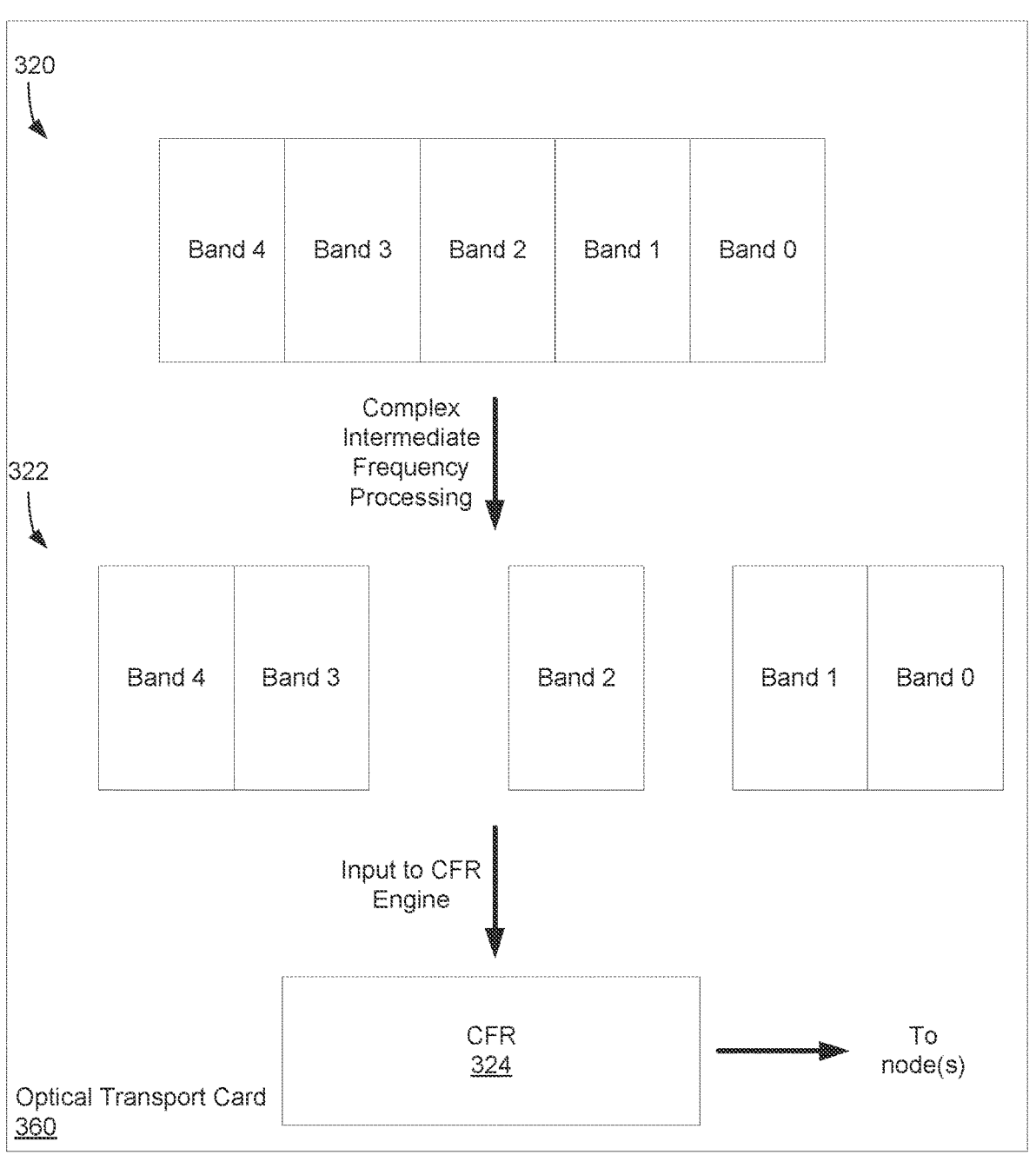
FIG. 3B depicts a block diagram of an optical transport card configured to perform CFR, according to one or more embodiments.

In some embodiments, for example, corresponding to system 200B, the system controller 202 can process and perform CFR for a downlink signal as shown in FIG. 3B. In one implementation, the signal processing is performed in one or more optical transport cards 360 of the system controller 202 (e.g., a master unit 100 including an RF transceiver unit 106 coupled to optical transport card 105 described in FIG. 1) instead of the main processing circuitry (e.g., FPGA 108) of the master unit or at the nodes 208. Each optical transport card 360 is respectively associated with one or more nodes 208 in the distributed communication system through, for example, a respective downlink signal path (that is, each optical transport card 360 operates in a simulcast mode with one or more nodes 208).

Referring to FIG. 3B, optical transport card 360 receives a downlink signal spectrum 320 from network interface 204 including a plurality of signal bands (band 0, band 1, band 2, band 3, band 4). Five signal bands are shown for pedagogical explanation though generally a downlink signal may include any number of signal bands. Each signal band will include a frequency interval (for example, a 5 MHz, 10 MHz, 15 MHz, or 25 MHz interval). Optical transport card 360 is configured to convert the downlink signal bands to an optical frequency spectrum 322. For example, the optical transport card 360 may include one or more FPGAs configured to reconstruct the downlink signal bands to a complex intermediate spectrum used for the optical frequency conversion. The optical transport card 360 is then configured (e.g., via the one or more FPGAs in the optical card 360) to perform CFR as described above and to generate a CFR-compensated output signal as a result of the CFR process.

By having the optical transport card 360 perform CFR instead of the nodes 208, the processing resources required to perform CFR can be offloaded from the node 208 to the optical transport card 360. For example, if CFR is performed in each node 208 of a distributed communication system instead of at the optical transport card 360, each node 208 may consume more power and demand more processing resources, which can add power consumption for the distributed communication system as a whole if say, 5, 10, or more nodes 208 are each performing their own respective CFR processes. In contrast, performing CFR once on the optical transport card 360 and transmitting the CFR-compensated output signal to each node 208 in the distributed communication system can reduce power consumption and the needed bit rate for the transport. And since each node 208 may have limited processing bandwidth (which typically is also used for other node functions such as uplink summing), implementing CFR on the optical transport card 360 can free up processing bandwidth of each node 208 and improve node efficiency. Accordingly, the distributed communication system can be implemented with less power consumption as a result of CFR processing done once on a downlink signal instead of multiple times (for example, four times) for each node in the distributed communication system.

In some embodiments, CFR is performed in either the optical transport card 360 via CFR engine 324 or by the nodes 208 associated with the optical transport card 360 based on the available processing bandwidth of the optical transport card 360. If the optical transport card 360 has sufficient processing bandwidth to perform CFR (indicated by an appropriate threshold), then CFR functionality can be offloaded from the nodes 208 to the optical transport card 360, and the optical transport card 360 performed CFR and transmits the CFR-compensated output signals to each associated node 208, as shown in system 200B. Conversely, if the optical transport card 360 does not have sufficient processing capacity to perform CFR for one or all of the nodes 208 associated with the optical transport card 360, then CFR functionality is not offloaded to the optical transport card 360 for at least one associated node 208 (or every node), and the nodes 208 whose CFR processing is not offloaded (e.g., each associated node) then perform CFR as shown in system 200A.

Figure 4:
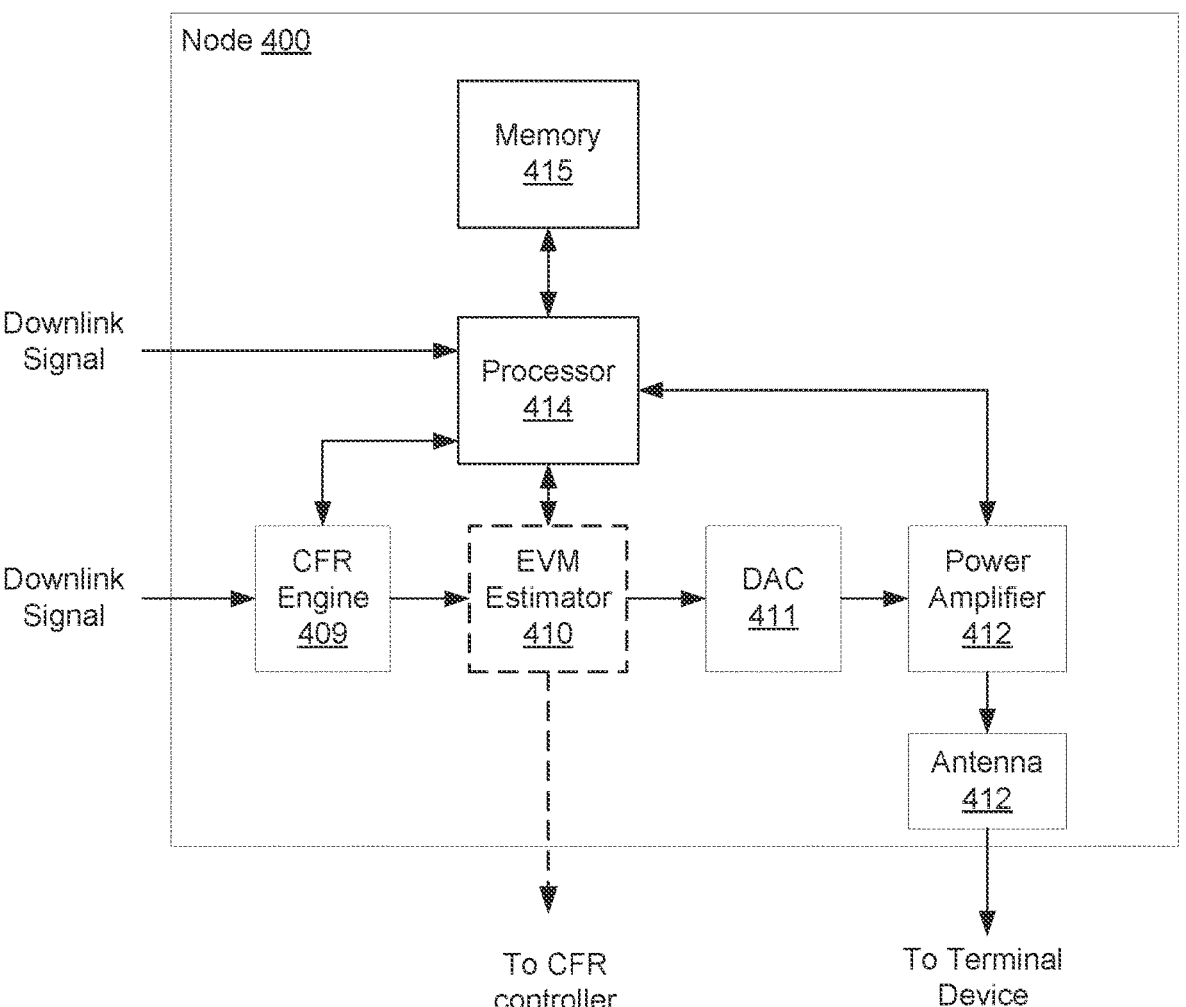
FIG. 4 depicts a block diagram of a node of a distributed communication system configured to perform crest factor reduction of a downlink signal according to one or more embodiments.

FIG. 4 depicts a block diagram of a node configured to perform crest factor reduction of a downlink input signal in a distributed communications system. In various implementations the node 400 can be implemented as a remote unit, intermediate unit, access point, or other component of a distributed communications system. The node 400 may include the functionality of the nodes described in FIGS. 1-3A, but may be operated differently in other implementations.

Node 400 is generally configured to receive a downlink signal and to convert the downlink signal into a format suitable for transmission to one or more terminal devices, such as phones, laptops, personal digital assistants (PDAs), and the like. Node 400 includes a processor 414 coupled to a memory 415, CFR engine 409, and power amplifier 412. Processor 414 (e.g., node configuration manager 214 of FIGS. 2A-2B) is optionally coupled to an EVM estimator 410 and to an input port of the node 400. CFR engine 409 is coupled to an input port of the node 400 (either the same input port as processor 414 or a different input port as shown in FIG. 4) and either directly coupled to DAC 411 or indirectly coupled to DAC 411 via EVM estimator 410. The input ports may be coupled to RF communication links or optical communication media such as fiber optic cables. In at least one implementation, node 400 is configured to communicate wirelessly to system controller 202.

CFR engine 409 is configured to receive a downlink signal and configured to perform crest factor reduction on the downlink signal to produce a CFR-compensated output signal as described further herein. In one implementation, CFR engine 409 is configured to reduce the PAPR of the downlink signal by clipping (reducing) the peak signal level of the downlink signal based on a clipping level threshold. Exemplary embodiments of a CFR engine 409 are further described with respect to FIG. 5.

In one implementation, the downlink signal will include information regarding the CFR configuration parameters used to perform CFR processing from CFR controller 206, such as the re-sampling rate and the CFR coefficients. Processor 414 is configured to extract the CFR configuration parameters from the downlink signal and to determine one or more signal parameters of the signal. Processor 414 is then configured to set the clipping level threshold based on the CFR configuration parameters and the determined signal parameters. Once the signal clipping threshold is determined, processor 414 is configured to adjust the CFR processing of CFR engine 409 in accordance with the clipping level threshold. As processor 414 receives updated signal parameters and CFR configuration parameters, processor 414 then adjusts the signal clipping threshold based on the new parameters, thereby enabling node 400 to adaptively reconfigure CFR of signals based on the changing dynamics of the distributed communications system, including changes to MCS (EVM) output power and signal bandwidth (spectral power density), emission mask compliance to industry standards (FCC, OFCOM, 3GPP 5G/LTE, etc.), frequency ranges, filtering quality, and/or from changes to signal amplitudes and wireless technologies.

Node 400 optionally includes an EVM estimator 410, which is configured to determine the EVM or other signal interference characteristic (e.g., ACLR) of the CFR-compensated signal from CFR engine 409. When EVM estimator 410 is implemented, it can provide the signal interference characteristics to processor 414. Processor 414 can adjust the signal clipping threshold based on the signal interference characteristics. Node 400 is optionally coupled to CFR controller 206 as described in FIGS. 2A-2B; in these implementations, the EVM estimator 410 can provide the signal interference characteristics to the CFR controller 206 for reconfiguration of the CFR parameters as previously described. Alternatively, the functionality of the EVM estimator 410 and/or CFR engine 409 can be included in processor 414.

The CFR-compensated output signal and optionally the signal interference characteristic is provided to DAC 411, which is configured to convert the digital CFR-compensated signal into an analog representation of the signal. The analog CFR-compensated signal is then provided to power amplifier 412, which amplifies the signal. The amplified signal can then be provided to an output port of node 400 or may undergo further processing before the signal is output for reception to one or more terminal devices. Additionally, power amplifier 412 is configured to provide a feedback signal to the processor 414 that includes parameters corresponding to the power amplifier 412. The parameters can include the frequency of the CFR-compensated output signal, the temperature of the power amplifier or proximate to the power amplifier, or one or more operating parameters of the power amplifier (such as the peak power specifications). In an embodiment, processor 414 is configured to adjust the signal clipping threshold based on at least the parameters provided by power amplifier 412 (for example). The signal parameters, CFR configuration parameters, and the parameters provided by power amplifier 412 are stored in memory 415. For example, memory 415 includes a database that stores the signal parameters, CFR configuration parameters, and the power amplifier parameters in a multi-dimensional matrix table format. Processor 414 can then access the database stored in memory 415 to compute or select the appropriate signal clipping threshold and reconfigure CFR engine 409 with the signal clipping threshold.

In an exemplary embodiment, the signal parameters of the downlink digital signal are used in determining the signal clipping threshold. For example, certain signal parameters (the modulating and coding scheme (MCS), EVM, QAM, or OBUE) of the output signal may be required to satisfy certain thresholds for proper CFR. For example, a 256 QAM scheme may require that the CFR-compensated signal has a signal interference value that does not exceed 3% of the signal power, while a 64 QAM scheme may require a signal interference value not exceeding 7% of the signal power. Likewise, processor 414 can adjust the signal clipping threshold so that the EVM or OBUE of the CFR-compensated signal cannot exceed defined limits. Specific limits will depend on the implementation and the operation of the distributed communication system. Processor 414 is configured to determine whether the signal clipping level satisfies the requirement resulting from the signal parameters, configuration parameters, and/or power amplifier parameters and if so, to reconfigure CFR engine 409 accordingly.

In some embodiments, processor 414 also determines the signal clipping threshold based on parameters of the CFR-compensated output signal. For example, processor 414 is configured to determine the output power of the CFR-compensated signal or the spectral power density of the CFR-compensated signal and adjust the signal clipping threshold based on the output power or spectral power density of the signal. If the output power or spectral power density is too large (so that the CFR-compensated output signal is likely to cause the power amplifier to be saturated), processor 414 can then modify the signal clipping threshold to reduce the likelihood of saturation in the power amplifier. Conversely, if the output power or spectral power density are determined to be such that the risk of saturation is low or signal peaks in saturation can be tolerated, the signal clipping threshold can be increased to input a minimally distorted signal into the power amplifier.

Additionally, in some embodiments processor 414 determines the signal clipping threshold based on feedback provided from power amplifier 412. For example, processor 414 can receive information on parameters such as the operating frequency of the power amplifier, the temperature of the power amplifier, and the output power of the power amplifier, in addition to other parameters unique to the particular power amplifier circuitry such as the peak power and other specifications of the power amplifier (which can be determined a priori or measured in real-time). In one implementation, processor 414 adjusts the signal clipping threshold to a level that enables CFR engine 409 to output a CFR-compensated signal that matches the peak power of the power amplifier. Processor 414 can then reduce the signal clipping threshold if the feedback from the power amplifier indicates that the power amplifier is saturated or, in some implementations, modifies the signal clipping threshold to optimize the output power of the CFR-compensated signal provided to the power amplifier. In this way, CFR can be adaptively reconfigured to the peak performance of the power amplifier without saturating the power amplifier. For example, parameters of the power amplifier can be reconfigured with gate voltage to improve peak amplifier power or improve efficiency based on the signal parameter. CFR can also be reconfigured quickly to minimize delays and preserve data throughput of signals received by node 400.

Figure 5:
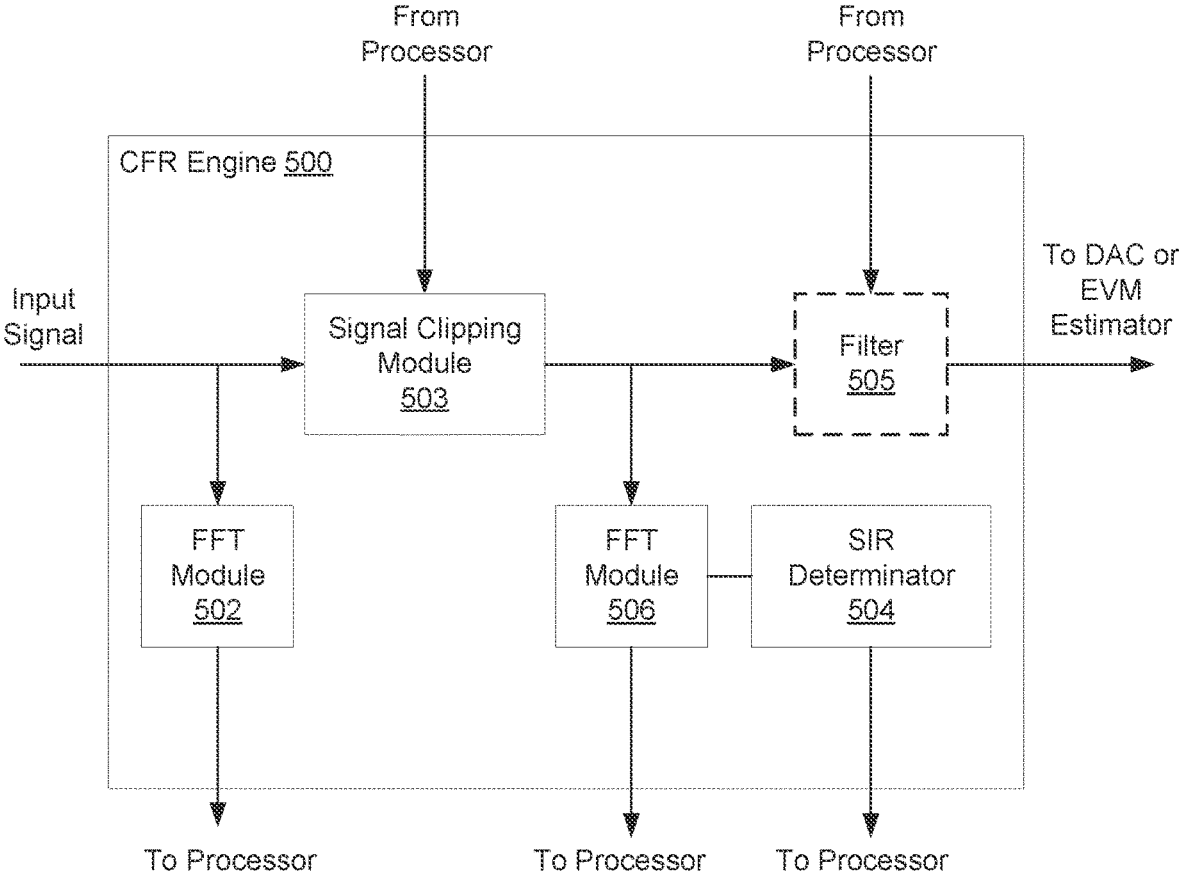
FIG. 5 depicts a block diagram of a CFR engine configured to perform crest factor reduction according to one or more embodiments.

FIG. 5 depicts a block diagram of a CFR engine configured to perform crest factor reduction. CFR engine 500 may be implemented in connection with the techniques described with respect to FIGS. 1-4, but may be implemented by other techniques. For example, CFR engine 500 optionally performs the functionality described with respect to CFR engine 209 as shown in FIG. 2A or 2B, or as shown in FIG. 4. CFR engine 500 and its associated functions may be implemented by a digital signal processor, FPGA, or other processor comprising appropriate circuitry for performing the associated modules. In some implementations, at least some of the functions implemented by CFR engine 500 are performed by software or firmware.

CFR engine 500 is configured to dynamically adjust crest factor reduction of signals provided to a power amplifier, e.g., power amplifier 412. CFR engine 500 includes an input configured to receive a downlink digital signal from another component of the distributed communications system, such as a master unit, remote unit, intermediate unit, or access point.

The downlink digital signal is provided to FFT module 502, which is configured to perform a fast Fourier transform (FFT) on the digital signal, thereby generating a representation of the downlink digital signal in the frequency domain. The frequency-domain downlink signal is then transmitted from FFT module 502 to processor 414 (e.g., node configuration manager 214). Additionally, the downlink digital signal is provided to signal clipping module 503. Other Fourier transforming techniques may be used.

FFT module 502 provides the transformed signal to signal clipping module 503. Signal clipping module 503 is configured to "clip" the peak signal levels of the downlink digital signal in the time domain based on a signal clipping threshold provided from, e.g., processor 414. The clipping level is provided by a processing system such as processor 414 and is determined as described with respect to FIG. 4, that is, the clipping level can be determined based on one or more of: the signal parameters of the downlink digital signal before CFR processing by CFR engine 409/500 (including the signal interference characteristics determined by EVM estimator 410), the parameters of the CFR-compensated output signal after processing by CFR engine 409/500, the operating parameters of the power amplifier after CFR, and/or the CFR configuration parameters transmitted by CFR controller 206. As previously described in the context of FIG. 4, signal parameters of the downlink digital signal include time division duplex (TDD), frequency division duplex (FDD), the operating frequency band of the signal, modulation parameters (for example, the quadrature amplitude modulation (QAM) scheme, spectral power density of the signal, and the composite output power of the CFR-compensated signal. For example, signals that have relatively low modulation schemes generally allow for higher signal clipping interference (and thus a lower signal clipping threshold) without substantial impact to throughput and data rate. However, signals that require small out-of-band emissions at high power, or high power spectral density, have much lower tolerance for signal interference. For these low signal interference requirements, the signal clipping threshold is higher to reduce the level of interference with the CFR-compensated output signal. Additionally, the signal clipping threshold can be adjusted based on operating parameters of the power amplifier or the CFR parameters acquired upstream from CFR controller 206, as previously described.

Signal clipping module 503 transmits the clipped downlink digital signal to FFT module 506, which is configured to perform a fast Fourier transform (FFT) on the clipped downlink digital signal, thereby generating a representation of the clipped downlink digital signal in the frequency domain. The frequency-domain clipped downlink digital signal is then transmitted from FFT module 506 to processor 414 (e.g., node configuration manager 214). In some embodiments, processor 414 determines the signal clipping threshold based on the frequency-domain representations of the downlink digital signal before clipping by signal clipping module 503 (that is, the signal provided by FFT module 502) and the frequency-domain representation of the downlink digital signal after it is clipped by signal clipping module 503 (that is, the signal provided by FFT module 506).

FFT module 506 is also configured to provide the frequency-domain representation of the downlink digital signal to SIR determinator 504, which is configured to determine the SIR of the clipped signal; that is, the ratio of the signal power and the interference power of the clipped signal. The signal clipping threshold can also be adjusted based on the determined SIR ratio. For example, in one implementation the signal parameters of the CFR-compensated output signal are evaluated in a matrix stored in memory and results in a desired signal-to-interference ratio determined from the signal parameters. Also, the desired signal-to-interference ratio can represent the minimum required signal-to-interference ratio based on signal requirements that the CFR-compensated output signal must satisfy, such as an EVM or OBUE of the CFR-compensated output signal. SIR determinator 504 provides the determined SIR to processor 414.

In this implementation, processor 414 compares a desired signal-to-interference ratio with the output signal-to-interference ratio determined by SIR determinator 504. When the signal-to-interference ratio from SIR determinator 504 is outside a tolerance margin of the signal-to-interference ratio calculated from the signal parameters, power amplifier parameters, and/or the CFR parameters, processor 414 is configured to adjust the signal clipping threshold level to match the desired signal-to-interference threshold within the tolerance margin. In some implementations, the SIR determination is used to determine a signal interference characteristic like EVM estimation (e.g., by EVM estimator 210) and further used to reconfigure the CFR configuration parameters distributed for the CFR engine 500 (by sending a diagnostic message to CFR controller 206).

CFR engine 500 optionally includes a filter 505 (e.g., a low-pass filter, band-pass filter, or a combination thereof) configured to filter the clipped signal in the frequency domain. When implemented, filter 505 can remove out of carrier signal components or other unwanted signal components in the signal spectrum, which can further enhance the CFR-compensated output signal for sensitive signal requirements such as a stringent OBUE of the signal or a high output power requirement. For example, processor 414 is configured to determine the filtering coefficients and settings and to set filter 505 accordingly. The filtered signal that corresponds to the CFR-compensated signal from signal clipping module 503 is then provided to a digital-analog converter (DAC) to convert the digital signal into an analog representation. If filter 505 is not implemented, then the output from signal clipping module 503 can be provided to the DAC and optionally to, e.g., EVM estimator 410 in order to determine the EVM of the CFR-compensated output signal and if needed, to adjust the signal clipping threshold by processor 414, as shown in FIG. 4.

It should be noted that while FIGS. 2A-5 describe CFR processing of signals in the downlink path of a distributed communications system, the CFR processing techniques described herein can also apply to uplink signal processing, e.g., from signals derived from terminal devices to be processed and transmitted to base stations.

FIG. 6 depicts a block diagram of a distributed antenna system, which may be used to implement the CFR configuration techniques described herein. The DAS 600 depicted in FIG. 6 resembles a general DAS architecture but in some implementations can be modified as an analog, digital DAS, or virtual DAS (vDAS). DAS 600 is one exemplary implementation of the distributed communications system 200 depicted and described with respect to FIGS. 2A-2B.

DAS 600 includes a base station 620 communicatively coupled to master unit 622 and configured to transmit downlink communication signals to master unit 622. In some implementations, base station 620 is configured as an analog base station that transmits analog downlink signals to master unit 622 through an RF communication link such as a coaxial cable or fiber optic cable. Alternatively, base station 620 can be a digital base station 620 configured to transmit digital downlink signals to master unit 622 through suitable digital communication media. In another implementation, the base station 620 functionality can be distributed into a baseband unit (BBU) communicatively coupled to one or more remote radio heads (RRH).

Master unit 622 is generally configured to process the downlink communication signals to provide wireless service to terminal devices (not shown in FIG. 6) located in a coverage zone 634. Master unit 622 is communicatively coupled to one or more remote units 635, in which the remote units 635 are configured to process the downlink communication signals from master unit 622 and radiate RF signals based on the downlink communication signals to the user equipment located in the coverage zone 634. Optionally, master unit 622 is communicatively coupled to the remote units 635 via one or more intermediate units.

Master unit 622 is configured similar to system controller 202 of FIG. 2A or FIG. 2B. Master unit 622 includes an interface 623 such as an RF interface, point of interface (POI), or other interface depending on the implementation. Interface 623 is configured to receive downlink communication signals from the base station 620 to master unit 622. CFR controller 625 is configured to determine one or more signal parameters from the downlink signals. Based on the one or more signal parameters, CFR controller 625 is configured to determine one or more CFR configuration parameters. Master unit 622 is configured to generate a downlink transport signal and provide the downlink transport signal via RU interface 628 to each remote unit 635 that includes the CFR configuration parameters. The CFR configuration parameters are used to reconfigure the CFR engines 630 of each remote unit 635 as previously described. Both the signal parameters from the downlink communication signals received from base station 620 and the CFR configuration parameters can be stored in memory 624. In some implementations, master unit 622 includes a CFR engine (not shown in FIG. 6) configured to perform CFR on the downlink communication signal and transmit a CFR-compensated transport signal to each remote unit 635 as described in context to FIG. 2B and FIG. 3B. In these implementations, the remote units 635 may not require their own CFR engines 630 and alternatively will conventionally process the CFR-compensated transport signal from CFR controller 625.

Remote unit 635 includes a CFR engine 630, DAC 632, and power amplifier 633. In one implementation each CFR engine 630 is configured to perform CFR in accordance with the CFR configuration parameters received from CFR controller 625. Optionally, each remote unit 635 includes an EVM estimator 631 configured to determine an EVM or other signal interference characteristic of the CFR-compensated output signal and transmit the signal interference characteristic to CFR controller 625. The CFR-compensated signal is provided to DAC 632, which is configured to generate an analog representation of the CFR-compensated signal. DAC 632 then transmits the analog CFR-compensated signal to power amplifier 633. Ultimately, remote unit 635 is configured to radiate an RF signal based via one or more antennas 690 on the amplified CFR-compensated signal from power amplifier 633 to terminal devices. In some implementations, each remote unit 635 may include additional circuitry that processes the CFR-compensated signal before radiating the RF signal from antennas 690, for example, through additional digital pre-distortion (DPD) circuitry.

In other implementations, the CFR engine 630 may perform CFR on the downlink transport signal in accordance with FIG. 5. That is, CFR engine 630 can perform CFR based on a signal clipping threshold configured to be adjusted based on one or more signal parameters of the downlink digital signal input to CFR engine 630, operating parameters of the power amplifier 633, and optionally the CFR configuration parameters from CFR controller 625. In one implementation, CFR engine 630 performs CFR on the downlink transport signal based only on the CFR configuration parameters distributed by CFR controller 625. In another implementation, CFR engine 630 performs CFR on the downlink transport signal based on the adaptive and dynamic signal clipping described in FIG. 5. However, these implementations are not exclusive and may be combined.

Figure 7:
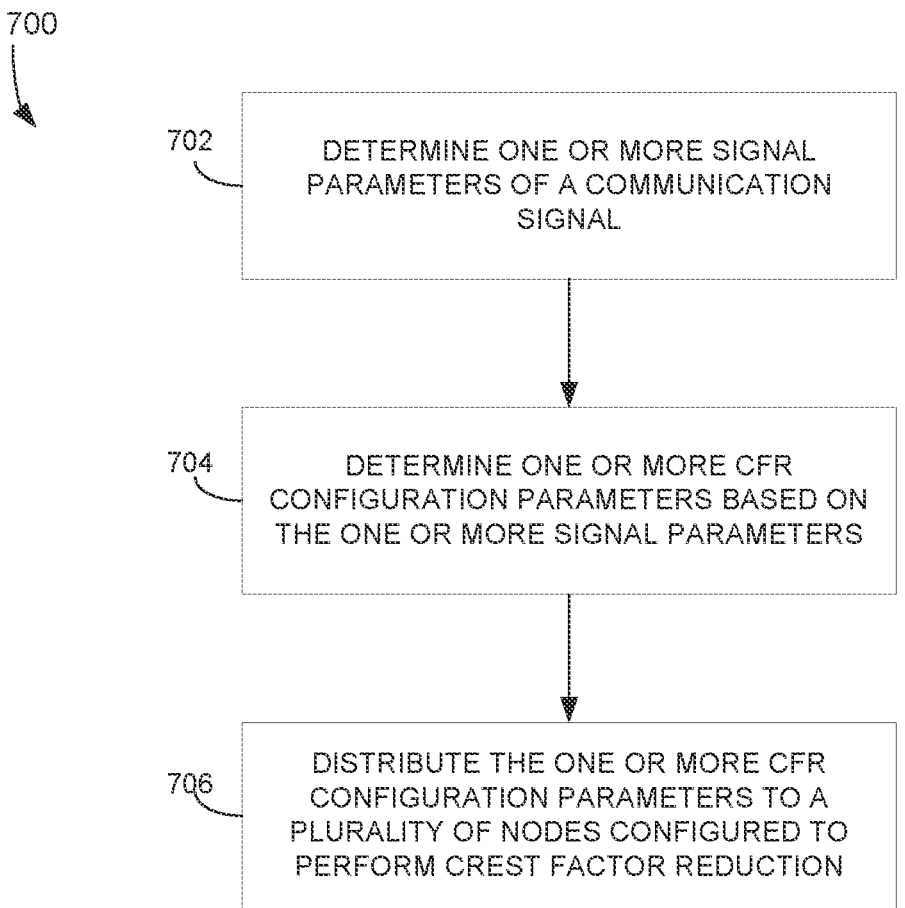
FIG. 7 depicts a flow diagram of a method for configuring crest factor reduction engines distributed across a distributed communication system according to one or more embodiments.

FIG. 7 depicts a flow diagram of a method for reconfiguring crest factor reduction performed by nodes of a distributed communication system. Method 700 may be implemented via the techniques described with respect to FIGS. 1-6, but may be implemented via other techniques as well. In one implementation, method 700 is performed by CFR controller 206 and/or CFR controller 625. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner). Also, most standard exception handling is not described for ease of explanation; however, it is to be understood that method 700 and the other methods described herein can and typically would include such exception handling.

Beginning at block 702, method 700 determines one or more signal parameters of a communication signal from a distributed communication system, such as a distributed antenna system. Signal parameters can be determined based on communication signals received on radio channels between analog RF communication links or data embedded in channels in accordance with a digital protocol such as CPRI or OBSAI. The signal parameters can include any one of: the type of wireless signal technology, signal bandwidth, spectral signal allocation, signal level, signal power, configuration of aggregated carriers processed by the same transceiver, and other parameters.

Method 700 then proceeds to block 704 and determines one or more CFR configuration parameters based on the one or more signal parameters. For example, the signal parameters can be used to determine the re-sampling rate, signal clipping threshold, or the values of the filtering CFR coefficients input into a CFR algorithm. The CFR parameters can correspond to one or more channels of a signal band for each node of the distributed communication system (e.g., each remote unit of a distributed antenna system).

Proceeding to block 706, method 700 distributes the one or more CFR configuration parameters across a plurality of nodes configured to perform crest factor reduction. For example, each node can receive a downlink digital signal including the CFR configuration parameters. A node configuration manager 214 or other processor in the node can transmit control signals to a CFR engine to perform CFR based on the CFR configuration parameters from the downlink digital signal.

Optionally, each node in the distributed communication system provides feedback on signal interference characteristics of the CFR-compensated signal generated using the CFR configuration parameters, for example, the EVM, ACLR, or other characteristics of the CFR-compensated signal back to the CFR controller 206. For each node in which the output EVM, ACLR, or other signal interference characteristic exceeds a threshold, method 700 can respond by reconfiguring the CFR configuration parameters for the affected nodes so that the EVM, ACLR, or other signal interference characteristic of the CFR-compensated output signal from the CFR engine is within desired CFR constraints. For example, in one embodiment, the EVM or ACLR can also be used to renew the correction pulse for different carrier configurations, power levels, or modulation schemes. Method 700 also may issue an alert for each node whose signal interference characteristic signal measurement exceeds the threshold.

Figure 8:
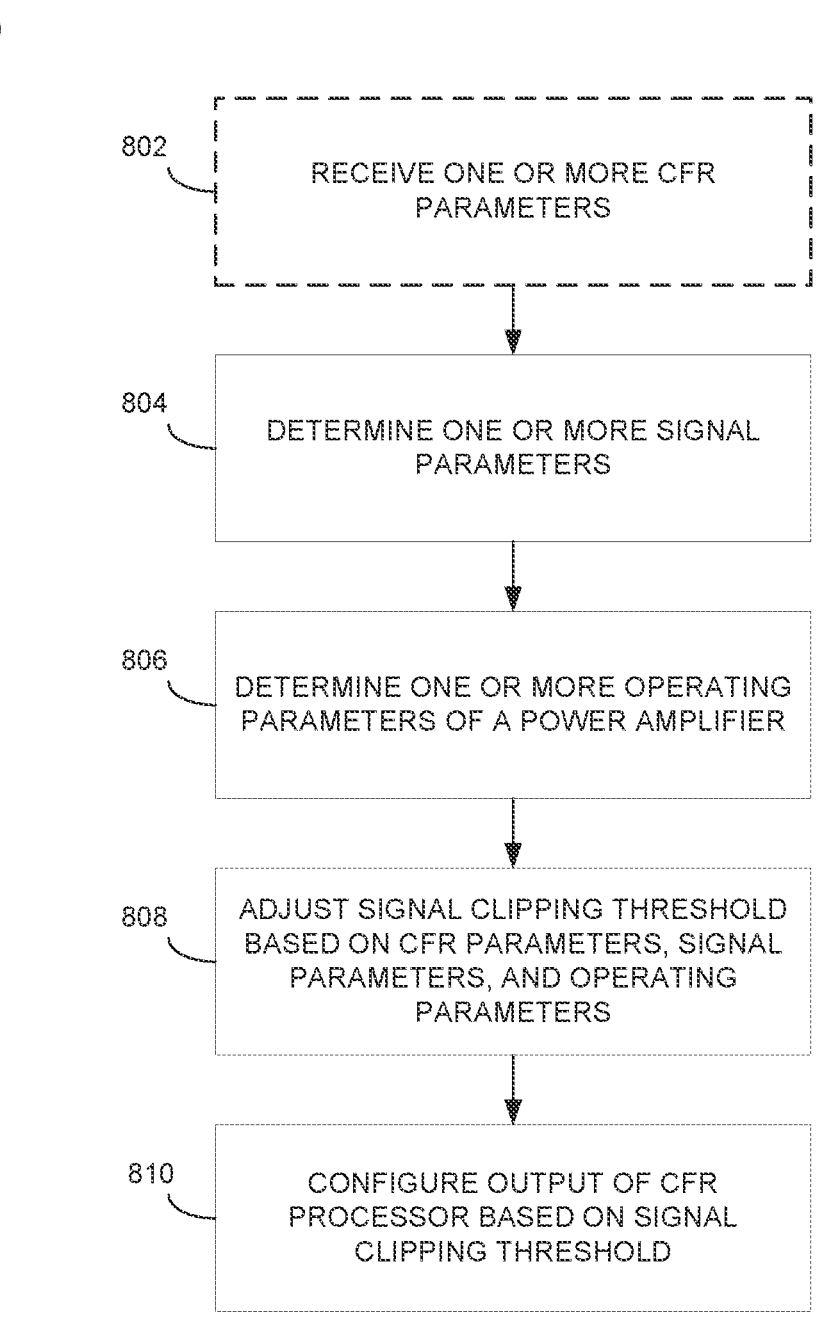
FIG. 8 depicts a flow diagram of a method for adjusting the signal clipping threshold of a crest factor reduction algorithm according to one or more embodiments.

FIG. 8 depicts a flow diagram of a method for adjusting the signal clipping threshold of a crest factor reduction algorithm. The CFR algorithm is configured to reduce the crest factor of a digital signal, e.g., a downlink digital signal, configured to be provided to a power amplifier. Method 800 may be implemented via the techniques described with respect to FIGS. 1-7, but may be implemented via other techniques as well. In one implementation, method 800 is performed by processor 414 (e.g., node configuration manager 214) in conjunction with the CFR engines of FIGS. 2-6. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 800 optionally includes receiving one or more CFR configuration parameters from a CFR controller in the distributed communications system at block 802. For example, the CFR configuration parameters can include a re-sample rate, a signal clipping threshold, or a set of CFR coefficients used to calibrate the CFR algorithm performed by method 700. At block 804, method 800 receives a digital signal (for example, a downlink digital signal) and determines one or more signal parameters from the digital signal and/or from the CFR-compensated output signal that is output from the CFR engine. For example, the signal parameters can include an MCS, EVM, or OBUE mask, the output power of the CFR-compensated signal, the spectral power density of the CFR-compensated signal. In some embodiments, the spectral power density is represented as a function of the signal bandwidth (such as a 5 MHz, 20 MHz, 100 MHz bandwidth). Some signal parameters, such as the EVM, may be represented as a percentage. Other signal parameters may also be used.

At block 806, method 800 determines one or more operating parameters of a power amplifier configured to receive the CFR-compensated signal. For example, the operating parameters can include the operating frequency of the power amplifier, the temperature of the power amplifier or an environment proximate to the power amplifier, and the output power of the power amplifier, in addition to other parameters unique to the particular power amplifier circuitry such as the peak power and other specifications of the power amplifier (which can be determined a priori or measured in real-time).

Method 800 then proceeds to block 808 to determine (or adjust) a signal clipping threshold used for the CFR process based on the signal parameters and the operating parameters. In one implementation, method 800 adjusts the signal clipping threshold to a level that enables a CFR engine to output a CFR-compensated signal that matches the peak power of the power amplifier. The signal clipping threshold can be reduced if the analysis of the signal parameters and the operating parameters indicate that the power amplifier is saturated. In some implementations, the signal clipping threshold can be adaptively increased or reduced to optimize the output power of the CFR-compensated signal provided to the power amplifier without saturating the power amplifier. Optionally, the CFR configuration parameters are used to determine or adjust the signal clipping threshold.

Proceeding to block 810, method 800 configures a CFR engine based on the determined or adjusted signal clipping threshold, for example, by configuring the CFR engine to perform CFR with the new signal clipping threshold. In this way, CFR can be adaptively reconfigured to the peak performance of the power amplifier without saturating the power amplifier. CFR can also be reconfigured quickly to minimize delays and preserve data throughput.

Figure 9:
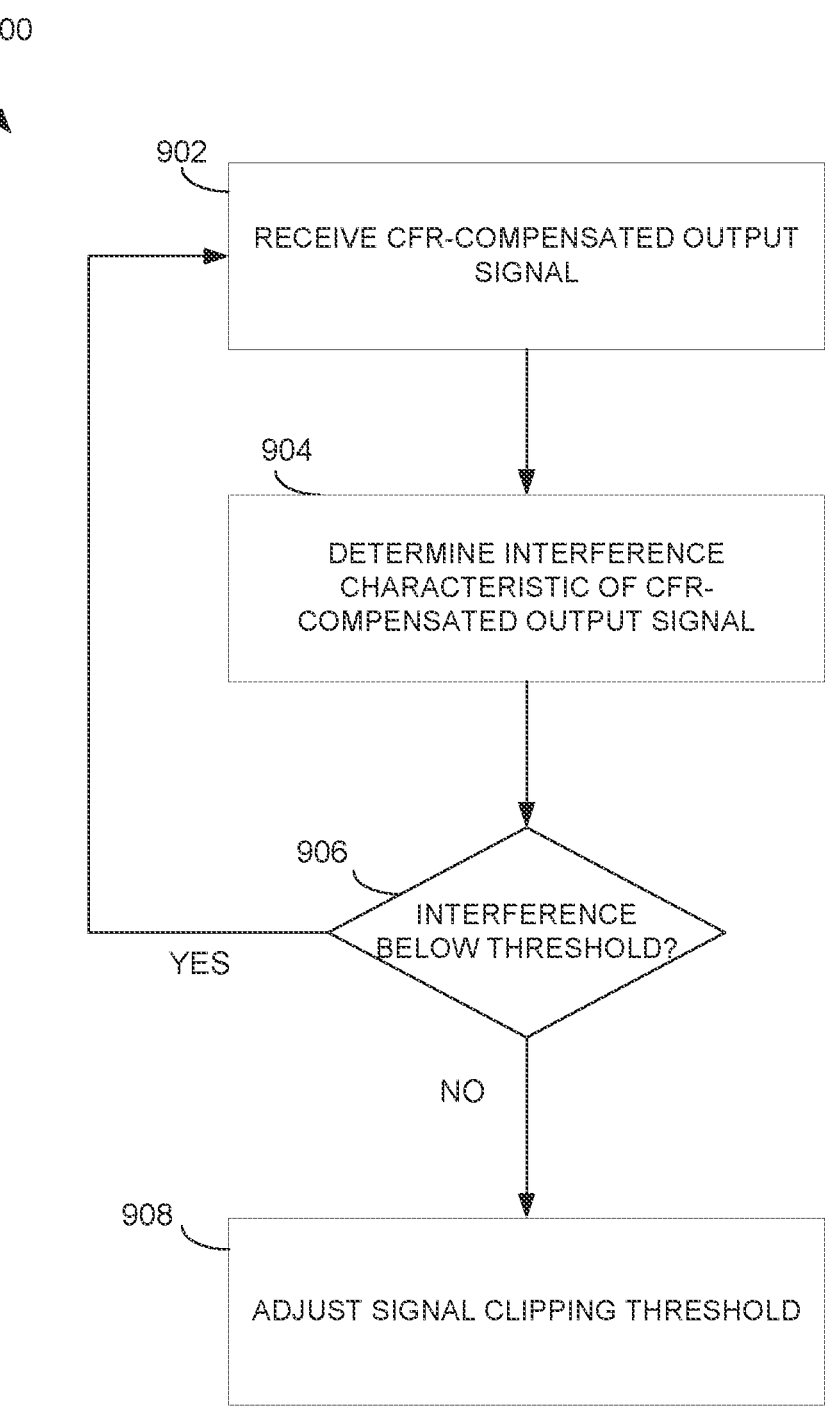
FIG. 9 depicts a flow diagram for monitoring the output of a crest factor reduction engine according to one or more embodiments.

FIG. 9 depicts a flow diagram illustrating an exemplary method for monitoring the output of a crest factor reduction processor, such as the CFR engines described in the context of FIGS. 1-8. Method 900 can be iteratively repeated as a feedback loop used to dynamically adjust the signal clipping threshold based on new iterations of data. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 900 begins at block 902 by receiving an output signal (a CFR-compensated signal) corresponding to a CFR engine configured to perform CFR from a downlink digital signal. Method 900 then proceeds to block 904 and determines one or more signal interference characteristics of the CFR-compensated output signal. The interference characteristics can include, for example, an EVM, ACLR, or other characteristic indicative of an interference or noise of the CFR-compensated output signal.

Proceeding to block 906, method 900 determines whether the one or more signal interference characteristics (e.g., SIR and/or ACLR) are below a threshold value. In one implementation, the threshold value can correspond to an interference that will likely cause oversaturation of the power amplifier that receives the CFR-compensated output signal. The threshold value can represent a percentage of the signal interference compared to the total power of the CFR-compensated signal. For example, a 256 QAM scheme may require that the CFR-compensated signal has a signal interference characteristic value that does not exceed a resulting EVM of 3% while a 64 QAM scheme may require a signal interference characteristic value not exceeding a resulting EVM of 7%. Specific thresholds will depend on the implementation and the operation of the distributed communications system. If none of the signal interference characteristics are below their given threshold values, then the CFR-compensated output signal meets the signal interference requirements. Accordingly, method 900 proceeds from block 906 back to block 902 to receive another signal from the CFR processor and to repeat the above steps.

If one or more of the signal interference characteristics exceed their given threshold values (for example, the EVM for the CFR-compensated output signal exceeds a desired EVM threshold), method 900 proceeds to block 908 and adjusts a signal clipping threshold used in the CFR process to generate the CFR-compensated output signal. The adjusted signal clipping threshold is then provided to the CFR engine to update the parameters to configure the state machine that implements the CFR process. In doing so, method 900 allows the optimization of signal being provided in the power amplifier in terms of peak signal levels and out of band unwanted emissions. Thus, the benefits of a power amplifier in terms of costs, efficiency, output power, and linearity, can be fully used with desired signal quality and negligible unwanted emissions from the power amplifier.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and the like. Any of the foregoing may be supplemented by, or incorporated in, specially-designed application specific integrated circuits (ASICs).

EXAMPLE EMBODIMENTS

Example 1 includes a distributed communication system, comprising: a system controller comprising: a network interface configured to receive communication signals from at least one base station; at least one processor coupled to the network interface, wherein the at least one processor is configured to: determine at least one signal parameter of the communication signals; determine at least one crest factor reduction (CFR) configuration parameter based on the at least one signal parameter; and a plurality of nodes communicatively coupled to the system controller, wherein each node of the plurality of nodes comprises a CFR engine configured to implement a CFR process, wherein the system controller is configured to distribute the at least one CFR configuration parameter to each node by transmitting a transport signal including the at least one CFR configuration parameter to each node, wherein each node is configured to: generate a CFR-compensated output signal from the transport signal based on the at least one CFR configuration parameter corresponding to each node; generate an amplified signal based on the CFR-compensated output signal; transmit an output signal based on the amplified signal to one or more terminal devices.

Example 2 includes the distributed communication system of Example 1, wherein the distributed communications system is a distributed antenna system (DAS) or a radio access network (RAN).

Example 3 includes the distributed communication system of any of Examples 1-2, wherein the system controller includes at least one optical transport card, wherein the system controller is configured to offload at least a portion of CFR processing from at least one node of the plurality of nodes to the at least one optical transport card based on a processing bandwidth of the at least one optical transport card.

Example 4 includes the distributed communication system of any of Examples 1-3, wherein the at least one signal parameter includes a type of the communication signals, a bandwidth of the communication signals, an amplitude of the communication signals, a spectrum of the communication signals, or a carrier transmit configuration.

Example 5 includes the distributed communication system of any of Examples 1-4, wherein the at least one CFR configuration parameter includes a resampling rate, a signal clipping threshold, or values of one or more CFR coefficients.

Example 6 includes the distributed communication system of any of Examples 1-5, wherein each node includes an error vector magnitude (EVM) estimator coupled to the CFR engine and configured to receive a CFR-compensated output signal from the CFR engine, wherein each EVM estimator is configured to measure a signal interference characteristic of the CFR-compensated output signal.

Example 7 includes the distributed communication system of Example 6, wherein the signal interference characteristic includes at least one of: an error vector magnitude of the CFR-compensated output signal, a signal-interference ratio of the CFR-compensated output signal, or an adjacent channel leakage ratio (ACLR) of the CFR-compensated output signal.

Example 8 includes the distributed communication system of any of Examples 6-7, wherein the at least one processor is configured to: receive the signal interference characteristic corresponding to a respective node from the EVM estimator; determine whether the signal interference characteristic is below a threshold value; and reconfigure the at least one CFR configuration parameter transmitted to the respective node when the signal interference characteristic exceeds the threshold value.

Example 9 includes a node of a distributed communication system, the node comprising: a crest factor reduction (CFR) engine configured to receive a digital signal and configured to implement a CFR process with the digital signal to generate a CFR-compensated signal, a digital-to-analog converter configured to convert the CFR-compensated signal to an analog signal; and a power amplifier configured to generate an amplified signal from the analog signal; and at least one processor coupled to the CFR engine and the power amplifier, wherein the at least one processor is configured to: receive one or more of: at least one operating parameter of the power amplifier; or at least one signal parameter of the CFR-compensated signal; and adjust a signal clipping threshold of the CFR process based on one or more of: the at least one operating parameter of the power amplifier and the at least one signal parameter of the CFR-compensated signal, wherein the node is configured to transmit an output signal based on the amplified signal to one or more terminal devices serviced by the distributed communication system.

Example 10 includes the node of Example 9, wherein the node is a remote unit or access point of a distributed antenna system.

Example 11 includes the node of any of Examples 9-10, wherein to adjust the signal clipping threshold based on one or more of: the at least one operating parameter of the power amplifier and the at least one signal parameter of the CFR-compensated signal comprises: to determine at least one signal interference characteristic of the CFR-compensated signal based on the at least one signal parameter; to determine whether the at least one signal interference characteristic is below a threshold value; to adjust the signal clipping threshold when the at least one signal interference characteristic exceeds the threshold value.

Example 12 includes the node of Example 11, wherein the at least one signal interference characteristic includes a signal-to-interference ratio of the CFR-compensated signal or an adjacent channel leakage ratio of the CFR-compensated signal.

Example 13 includes the node of any of Examples 9-12, wherein the at least one operating parameter includes at least one of: a peak power of the power amplifier, a peak-to-average power ratio, an operating frequency of the power amplifier, a temperature of the power amplifier, or operating specifications of the power amplifier.

Example 14 includes the node of any of Examples 9-13, wherein the at least one signal parameter includes at least one of: a power of the CFR-compensated signal, a signal bandwidth of the CFR-compensated signal, a modulated coding scheme (MCS) for the CFR-compensated signal, an operating band unwanted emissions (OBUE) for the CFR-compensated signal, an error vector magnitude (EVM) of the CFR-compensated signal, or a spectral power density of the CFR-compensated signal.

Example 15 includes the node of any of Examples 9-14, wherein the at least one processor is configured to receive at least one CFR configuration parameter and to adjust the signal clipping threshold based on the one or more CFR configuration parameter, wherein the at least one CFR configuration parameter includes at least one of: a resampling rate, a predetermined signal clipping threshold, or values of one or more CFR coefficients.

Example 16 includes the node of any of Examples 9-15, wherein the CFR engine comprises a filter, wherein the filter is configured to filter out of band signal components from the CFR-compensated signal and to provide the filtered CFR-compensated signal to the digital-to-analog converter.

Example 17 includes a method for reconfiguring a plurality of nodes of a distributed communication system, each node configured to generate a crest factor reduction (CFR)-compensated signal and to transmit an output signal based on the CFR-compensated signal to one or more terminal devices serviced by the distributed communications system, the method comprising: receiving a communications signal from at least one base station; determining at least one signal parameter of the communications signal; determining at least one CFR configuration parameters based on the at least one signal parameter of the communications signal; and distributing the at least one CFR configuration parameter to the plurality of nodes.

Example 18 includes the method of Example 17, wherein the at least one signal parameter includes a type of the communication signal, a bandwidth of the communication signal, an amplitude of the communication signal, a spectrum of the communication signal, or a carrier transmit configuration.

Example 19 includes the method of any of Examples 17-18, wherein the at least one CFR configuration parameter includes a resampling rate, a signal clipping threshold, or values of one or more CFR coefficients.

Example 20 includes the method of any of Examples 17-19, further comprising: determining at least one signal interference characteristic corresponding to a respective node; determining that the signal interference characteristic is below a threshold value; and reconfiguring the at least one CFR configuration parameter transmitted to the respective node when the signal interference characteristic exceeds the threshold value.

Example 21 includes the method of Example 20, wherein the signal interference characteristic includes at least one of: an error vector magnitude of a CFR-compensated output signal generated from the plurality of nodes, or an adjacent channel leakage ratio (ACLR) of the CFR-compensated output signal generated from the plurality of nodes.

Example 22 includes a method for adjusting a signal clipping threshold provided to a crest factor reduction (CFR) engine, the method comprising: determining one or more of: at least one operating parameter of a power amplifier coupled to an output of the CFR engine, or at least one signal parameter of an output signal of the CFR engine; adjusting the signal clipping threshold based on the one or more of: the at least one signal parameter of the output signal or the at least one operating parameter of the power amplifier; and configuring the CFR engine to perform CFR on a digital signal based on the adjusted signal clipping threshold.

Example 23 includes the method of Example 22, wherein adjusting the signal clipping threshold comprises: determining at least one signal interference characteristic of the output signal based on the at least one signal parameter; determining whether the at least one signal interference characteristic is below a threshold value; adjusting the signal clipping threshold when the at least one signal interference characteristic exceeds the threshold value.

Example 24 includes the method of Example 23, wherein the at least one signal interference characteristic includes a signal-to-interference ratio of the output signal or an adjacent channel leakage ratio of the output signal.

Example 25 includes the method of any of Examples 22-24, wherein the at least one operating parameter includes at least one of: a peak power of the power amplifier, an operating frequency of the power amplifier, a temperature of the power amplifier, or operating specifications of the power amplifier.

Example 26 includes the method of any of Examples 22-25, wherein the at least one signal parameter includes at least one of: a power of the output signal, a signal bandwidth of the output signal, a modulated coding scheme (MCS) for the output signal, an operating band unwanted emissions (OBUE) for the output signal, an error vector magnitude (EVM) of the output signal, or a spectral power density of the output signal.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A distributed communication system, comprising:
a system controller comprising:
a network interface configured to receive communication signals from at least one base station;
at least one processor coupled to the network interface, wherein the at least one processor is configured to:
determine at least one signal parameter of the communication signals;
determine at least one crest factor reduction (CFR) configuration parameter based on the at least one signal parameter; and
a plurality of nodes communicatively coupled to the system controller, wherein each node of the plurality of nodes comprises a CFR engine configured to implement a CFR process,
wherein the system controller is configured to distribute the at least one CFR configuration parameter to each node by transmitting a transport signal including the at least one CFR configuration parameter to each node, wherein each node is configured to:

generate a CFR-compensated output signal from the transport signal based on the at least one CFR configuration parameter corresponding to each node;

generate an amplified signal based on the CFR-compensated output signal;

transmit an output signal based on the amplified signal to one or more terminal devices.

2. The distributed communication system of claim 1, wherein the distributed communications system is a distributed antenna system (DAS) or a radio access network (RAN).

3. The distributed communication system of claim 1, wherein the system controller includes at least one optical transport card, wherein the system controller is configured to offload at least a portion of CFR processing from at least one node of the plurality of nodes to the at least one optical transport card based on a processing bandwidth of the at least one optical transport card.

4. The distributed communication system of claim 1, wherein the at least one signal parameter includes a type of the communication signals, a bandwidth of the communication signals, an amplitude of the communication signals, a spectrum of the communication signals, or a carrier transmit configuration.

5. The distributed communication system of claim 1, wherein the at least one CFR configuration parameter includes a resampling rate, a signal clipping threshold, or values of one or more CFR coefficients.

6. The distributed communication system of claim 1, wherein each node includes an error vector magnitude (EVM) estimator coupled to the CFR engine and configured to receive a CFR-compensated output signal from the CFR engine, wherein each EVM estimator is configured to measure a signal interference characteristic of the CFR-compensated output signal.

7. The distributed communication system of claim 6, wherein the signal interference characteristic includes at least one of: an error vector magnitude of the CFR-compensated output signal, a signal-interference ratio of the CFR-compensated output signal, or an adjacent channel leakage ratio (ACLR) of the CFR-compensated output signal.

8. The distributed communication system of claim 6, wherein the at least one processor is configured to:

receive the signal interference characteristic corresponding to a respective node from the EVM estimator;

determine whether the signal interference characteristic is below a threshold value; and reconfigure the at least one CFR configuration parameter transmitted to the respective node when the signal interference characteristic exceeds the threshold value.

9. A node of a distributed communication system, the node comprising:

a crest factor reduction (CFR) engine configured to receive a digital signal and configured to implement a CFR process with the digital signal to generate a CFR-compensated signal, a digital-to-analog converter configured to convert the CFR-compensated signal to an analog signal; and a power amplifier configured to generate an amplified signal from the analog signal; and at least one processor coupled to the CFR engine and the power amplifier, wherein the at least one processor is configured to:

receive one or more of: at least one operating parameter of the power amplifier; or at least one signal parameter of the CFR-compensated signal; and adjust a signal clipping threshold of the CFR process based on one or more of: the at least one operating parameter of the power amplifier and the at least one signal parameter of the CFR-compensated signal, wherein the node is configured to transmit an output signal based on the amplified signal to one or more terminal devices serviced by the distributed communication system.

10. The node of claim 9, wherein the node is a remote unit or access point of a distributed antenna system.

11. The node of claim 9, wherein to adjust the signal clipping threshold based on one or more of: the at least one operating parameter of the power amplifier and the at least one signal parameter of the CFR-compensated signal comprises:

to determine at least one signal interference characteristic of the CFR-compensated signal based on the at least one signal parameter;

to determine whether the at least one signal interference characteristic is below a threshold value;

to adjust the signal clipping threshold when the at least one signal interference characteristic exceeds the threshold value.

12. The node of claim 11, wherein the at least one signal interference characteristic includes a signal-to-interference ratio of the CFR-compensated signal or an adjacent channel leakage ratio of the CFR-compensated signal.

13. The node of claim 9, wherein the at least one operating parameter includes at least one of: a peak power of the power amplifier, a peak-to-average power ratio, an operating frequency of the power amplifier, a temperature of the power amplifier, or operating specifications of the power amplifier.

14. The node of claim 9, wherein the at least one signal parameter includes at least one of: a power of the CFR-compensated signal, a signal bandwidth of the CFR-compensated signal, a modulated coding scheme (MCS) for the CFR-compensated signal, an operating band unwanted emissions (OBUE) for the CFR-compensated signal, an error vector magnitude (EVM) of the CFR-compensated signal, or a spectral power density of the CFR-compensated signal.

15. The node of claim 9, wherein the at least one processor is configured to receive at least one CFR configuration parameter and to adjust the signal clipping threshold based on the at least one CFR configuration parameter, wherein the at least one CFR configuration parameter includes at least one of: a resampling rate, a predetermined signal clipping threshold, or values of one or more CFR coefficients.

16. The node of claim 9, wherein the CFR engine comprises a filter, wherein the filter is configured to filter out of band signal components from the CFR-compensated signal and to provide the filtered CFR-compensated signal to the digital-to-analog converter.

17. A method for reconfiguring a plurality of nodes of a distributed communication system, each node configured to generate a crest factor reduction (CFR)-compensated signal and to transmit an output signal based on the CFR-compensated signal to one or more terminal devices serviced by the distributed communications system, the method comprising:

receiving a communications signal from at least one base station;

determining at least one signal parameter of the communications signal;

determining at least one CFR configuration parameter based on the at least one signal parameter of the communications signal;

distributing the at least one CFR configuration parameter to the plurality of nodes;

generating the CFR-compensated signal with a CFR engine configured to implement a CFR process using the at least one CFR configuration parameter corresponding to each node;

generating an amplified signal based on the CFR-compensated signal; and transmitting the output signal based on the amplified signal to the one or more terminal devices.

18. The method of claim 17, wherein the at least one signal parameter includes a type of the communications signal, a bandwidth of the communications signal, an amplitude of the communications signal, a spectrum of the communications signal, or a carrier transmit configuration.

19. The method of claim 17, wherein the at least one CFR configuration parameter includes a resampling rate, a signal clipping threshold, or values of one or more CFR coefficients.

20. The method of claim 17, further comprising:

determining at least one signal interference characteristic corresponding to a respective node;

determining that the at least one signal interference characteristic is below a threshold value; and reconfiguring the at least one CFR configuration parameter transmitted to the respective node when the at least one signal interference characteristic exceeds the threshold value, wherein the at least one signal interference characteristic includes at least one of: an error vector magnitude of a CFR-compensated output signal generated from the plurality of nodes, or an adjacent channel leakage ratio (ACLR) of the CFR-compensated output signal generated from the plurality of nodes.

* * * * *